US012689395B2

(12) United States Patent
Kao et al.

(10) Patent No.: US 12,689,395 B2
(45) Date of Patent: Jul. 21, 2026

(54) WIRELESS DEVICE CONTROL CIRCUIT WITH IDENTICAL MODULARIZED INTERNAL CIRCUIT ARCHITECTURE FOR DIFFERENT PROCESSING, AND ASSOCIATED WIRELESS COMMUNICATIONS DEVICE

(71) Applicant: MEDIATEK INC., Hsin-Chu (TW)

(72) Inventors: Ping-Hung Kao, Hsinchu City (TW);
Yung-Ting Tsai, Hsinchu City (TW);
Ming-Fu Sun, Hsinchu City (TW);
Hsiao-Kai Liao, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 319 days.

(21) Appl. No.: 18/506,115

(22) Filed: Nov. 9, 2023

(65) Prior Publication Data

US 2024/0171199 A1 May 23, 2024

Related U.S. Application Data

(60) Provisional application No. 63/383,273, filed on Nov. 11, 2022.

(51) Int. Cl.
| | |
|---|---|
| *H04B 1/00* | (2006.01) |
| *H04B 17/15* | (2015.01) |
| *H04L 5/00* | (2006.01) |
| *H04L 5/14* | (2006.01) |
| *H04W 72/04* | (2023.01) |

(52) U.S. Cl.
CPC .......... *H04B 1/006* (2013.01); *H04B 1/0064* (2013.01); *H04B 17/191* (2023.05)

(58) Field of Classification Search
None
See application file for complete search history.

(56) References Cited

U.S. PATENT DOCUMENTS 7,035,595 B1 * 4/2006 Kim ..................... H04B 1/0003
370/395.5
7,620,127 B1 * 11/2009 Koenck .............. H04L 27/0008
375/340

(Continued)

*Primary Examiner* — Tuan A Tran
(74) *Attorney, Agent, or Firm* — Winston Hsu

(57) ABSTRACT

A wireless device control circuit with modularized internal circuit architecture and associated wireless communications device are provided. The wireless device control circuit may include a first digital processing circuit and a second digital processing circuit. The first digital processing circuit is arranged to perform first digital processing corresponding to a first predetermined radio frequency band for the wireless communications device, the first digital processing including common processing and a first additional processing. The second digital processing circuit is arranged to perform second digital processing corresponding to a second predetermined radio frequency band for the wireless communications device, the second digital processing including the common processing and a second additional processing. The first digital processing circuit and the second digital processing circuit are identical to each other, and are arranged to perform the first and the second digital processing according to a first predetermined configuration and a second predetermined configuration, respectively.

11 Claims, 12 Drawing Sheets

(56)        References Cited

U.S. PATENT DOCUMENTS

| 8,055,313 | B2 * | 11/2011 | Behzad | H04W 52/0225 |
| | | | | 455/574 |
| 8,463,217 | B2 * | 6/2013 | Behzad | H04B 1/406 |
| | | | | 455/168.1 |
| 8,619,837 | B2 * | 12/2013 | Proctor, Jr. | H04B 7/15571 |
| | | | | 370/328 |
| 9,160,430 | B2 * | 10/2015 | Maltsev | H04B 7/0885 |
| 9,313,067 | B2 * | 4/2016 | Soliman | H04L 27/2626 |
| 9,602,157 | B2 * | 3/2017 | Eltawil | H04B 1/525 |
| 9,769,696 | B2 * | 9/2017 | Picker | H04W 72/52 |
| 9,800,443 | B2 * | 10/2017 | Liu | H04B 7/0871 |
| 9,844,069 | B2 * | 12/2017 | Gao | H04W 72/543 |
| 11,190,224 | B2 * | 11/2021 | Weissman | H04W 72/0453 |
| 11,190,250 | B2 * | 11/2021 | Gui | H04B 7/0408 |
| 11,675,047 | B2 * | 6/2023 | Vaucher | G01S 7/352 |
| | | | | 342/173 |
| 11,705,934 | B2 * | 7/2023 | Hsu | H04B 1/44 |
| | | | | 455/84 |
| 12,160,052 | B2 * | 12/2024 | Bloy | G08B 5/22 |
| 2005/0237919 | A1 * | 10/2005 | Pettendorf | H04J 13/12 |
| | | | | 370/208 |
| 2019/0123863 | A1 * | 4/2019 | Zhang | H04L 5/001 |
| 2019/0356464 | A1 * | 11/2019 | Khan | H04W 72/0453 |
| 2022/0116111 | A1 * | 4/2022 | Zhang | H04B 10/11 |
| 2022/0337283 | A1 * | 10/2022 | Hsu | H04B 1/58 |
| 2025/0062530 | A1 * | 2/2025 | Bloy | H04J 4/00 |

* cited by examiner

WIRELESS DEVICE CONTROL CIRCUIT WITH IDENTICAL MODULARIZED INTERNAL CIRCUIT ARCHITECTURE FOR DIFFERENT PROCESSING, AND ASSOCIATED WIRELESS COMMUNICATIONS DEVICE

CROSS REFERENCE TO RELATED APPLICATIONS

This application claims the benefit of U.S. Provisional Application No. 63/383,273, filed on Nov. 11, 2022. The content of the application is incorporated herein by reference.

BACKGROUND

The present invention is related to communications control architecture, and more particularly, to a wireless device control circuit with modularized internal circuit architecture, and an associated wireless communications device such as an access point (AP) device or any other wireless device.

According to the related art, a wireless communications system comprising a first AP device, a second AP device, etc. may be configured as a complicated network, and the associated control of the devices in wireless communications system may be complicated. As a result, the design loading of a digital processing control chip to be installed in an AP device such as the first AP device, the second AP device, etc. may increase, and the associated costs may increase correspondingly. Thus, a novel architecture is needed for solving the problem of the related art without introducing any side effect or in a way that is less likely to introduce a side effect.

SUMMARY

It is an objective of the present invention to provide a wireless device control circuit with modularized internal circuit architecture, and an associated wireless communications device such as an AP device or any other wireless device, in order to solve the above-mentioned problem.

At least one embodiment of the present invention provides a wireless device control circuit with modularized internal circuit architecture, for performing communications control within a wireless communications device. For example, the wireless device control circuit may comprise a first digital processing circuit and a second digital processing circuit. More particularly, the first digital processing circuit may be arranged to perform first digital processing corresponding to a first predetermined radio frequency band for the wireless communications device, where the first digital processing may comprise common processing and a first additional processing. In addition, the second digital processing circuit may be arranged to perform second digital processing corresponding to a second predetermined radio frequency band for the wireless communications device, where the second digital processing may comprise the common processing and a second additional processing. Additionally, the first digital processing circuit and the second digital processing circuit are identical to each other, and are arranged to perform the first digital processing and the second digital processing according to a first predetermined configuration and a second predetermined configuration, respectively.

In addition to the wireless device control circuit mentioned above, the present invention further provides the wireless communications device comprising the wireless device control circuit. For example, the wireless communications device may further comprise a first analog and radio frequency circuit and a second analog and radio frequency circuit. More particularly, first analog and radio frequency circuit is coupled between the first digital processing circuit and a first set of antennas, and is arranged to perform first analog and radio frequency processing corresponding to the first predetermined radio frequency band for the wireless communications device. In addition, second analog and radio frequency circuit is coupled between the second digital processing circuit and a second set of antennas, and is arranged to perform second analog and radio frequency processing corresponding to the second predetermined radio frequency band for the wireless communications device.

It is an advantage of the present invention that, through proper design, the wireless device control circuit of the present invention can be equipped with identical modularized internal circuits, in order to reduce the design loading in the design phase of the wireless device control circuit, and more particularly, reduce the associated costs such as labor costs and material costs in one or more subsequent phases (e.g., various pilot run phases) of the wireless device control circuit. In addition, the wireless device control circuit of the present invention can be installed in the wireless communications device to perform different operations with the aforementioned identical modularized internal circuits according to different predetermined configurations, respectively, without hindering any function of the wireless communications device. Additionally, the wireless device control circuit and the wireless communications device of the present invention can solve the problem of the related art without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
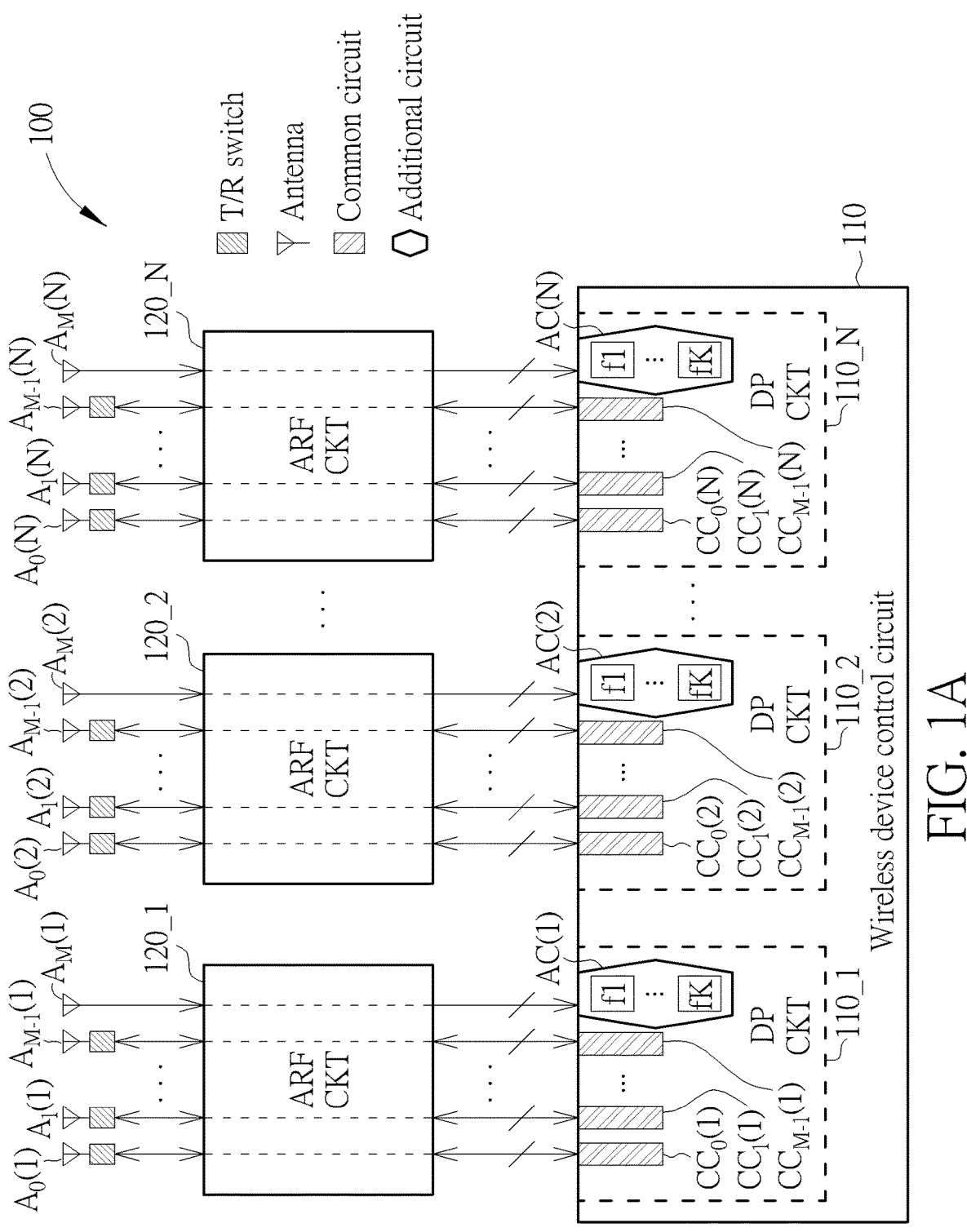
FIG. 1A is a diagram of a wireless communications device according to an embodiment of the present invention.

FIG. 1A is a diagram of a wireless communications device 100 according to an embodiment of the present invention. The wireless communications device 100 may comprise a wireless device control circuit 110 with modularized internal circuit architecture, at least one analog and radio frequency circuits 120_$n$ such as one or more analog and radio frequency circuits {120_1 . . . 120_N} which may be illustrated as multiple analog and radio frequency circuits 120_1, 120_2, . . . and 120_N (labeled "ARF CKT" for brevity), associated antennas such as the antennas {$A_0(1)$, $A_1(1)$, . . . , $A_{M-1}(1)$, $A_M(1)$}, {$A_0(2)$, $A_1(2)$, $A_{M-1}(2)$, . . . , $A_M(2)$}, . . . and {$A_0(N)$, $A_1(N)$, . . . , $A_{M-1}(N)$, $A_M(N)$}, and associated transmitting/receiving (T/R) switches. For example, the wireless communications device 100 may be implemented as an AP device within a wireless communications system, and more particularly, may perform wireless communications operations with one or more other devices within the wireless communications system, such as one or more other AP devices, one or more station (STA) devices, etc. With the aid of (M+1) antennas {$A_0(n)$, $A_1(n)$, . . . , $A_{M-1}(n)$, $A_M(n)$} corresponding to any predetermined radio frequency band BN(n–1) among N predetermined radio frequency bands BN(0), BN(1), . . . and BN(N–1), the wireless communications device 100 may provide an N-band M-transmit (M+1)-receive wireless communications service (e.g., a tri-band 4T5R or 4×5 wireless communications service, if N=3 and M=4) to other devices such as STA devices within the wireless communications system, using the corresponding antenna configuration (e.g., a 4T5R or 4×5 antenna configuration), and therefore allow for improved receive diversity and support multiple receive combining (MRC), where the wireless communications device 100 (or any component therein) may be compatible or back-compatible to one or more versions of the Institute of Electrical and Electronics Engineers (IEEE) 802.11 standards, but the present invention is not limited thereto. According to some embodiments, the wireless communications device 100 may be implemented as any STA device within the wireless communications system.

As shown in FIG. 1A, the wireless device control circuit 110 may be equipped with the modularized internal circuit architecture, for performing communications control within the wireless communications device 100. More particularly, the wireless device control circuit 110 may comprise at least one digital processing circuit 110_$n$ such as one or more digital processing circuits {110_1 . . . 110_N}, and any digital processing circuit 110_$n$ among the one or more digital processing circuits {110_1 . . . 110_N} may comprise at least one common circuit $CC_m(n)$ such as one or more common circuits {$CC_0(n)$ . . . $CC_{M-1}(n)$}, and further comprise an additional circuit AC(n) equipped with at least one partial circuit corresponding to at least one function fk such as one or more functions {f1 . . . fK}, where any symbol among the symbols "N", "M" and "K" may represent a positive integer, for example, N≥1, M≥1 and K≥1. According to some embodiments such as that shown in FIG. 1A, etc., the aforementioned at least one digital processing circuit 110_$n$, the aforementioned at least one common circuit $CC_m(n)$ and the aforementioned at least one function fk may be illustrated as multiple digital processing circuits 110_1, 110_2, . . . and 110_N (labeled "DP CKT" for brevity), multiple common circuits $CC_0(n)$, $CC_1(n)$, . . . and $CC_{M-1}(n)$ and multiple functions f1, . . . and fK, respectively, and any digital processing circuit 110_$n$ among the multiple digital processing circuits 110_1, 110_2, . . . and 110_N may comprise the multiple common circuits $CC_0(n)$, $CC_1(n)$, . . . and $CC_{M-1}(n)$, and further comprise the additional circuit AC(n) equipped with multiple partial circuits respectively corresponding to the multiple functions f1, . . . and fK, where the symbol "n" may represent an integer falling within the range of the interval [1, N], but the present invention is not limited thereto. In some examples, the architecture of the wireless device control circuit 110 as shown in FIG. 1A, the digital processing circuit count N of the one or more digital processing circuits {110_1 . . . 110_N} (e.g., the multiple digital processing circuits 110_1, 110_2, . . . and 110_N), the common circuit count M of the one or more common circuits {$CC_0(n)$ . . . $CC_{M-1}(n)$} (e.g., the multiple common circuits $CC_0(n)$, $CC_1(n)$, . . . and $CC_{M-1}(n)$), and/or the function count K of the one or more functions {f1 . . . fK} (e.g., the multiple functions f1, . . . and fK) may vary.

For better comprehension, the symbols "n1" and "n2" may represent different integers falling within the range of the interval [1, N]. Based on the architecture shown in FIG. 1A, for the case that n=n1, a first digital processing circuit 110_*n*1 (e.g., the digital processing circuit 110_1) among the multiple digital processing circuits 110_1, 110_2, . . . and 110_N may be arranged to perform first digital processing corresponding to a first predetermined radio frequency band BN(n1−1) (e.g., the predetermined radio frequency band BN(0), which may be referred to as the radio frequency band BN0 for brevity) for the wireless communications device 100, where the first digital processing may comprise common processing and a first additional processing. For example, a first analog and radio frequency circuit 120_*n*1 (e.g., the analog and radio frequency circuit 120_1) may be coupled between the first digital processing circuit 110_*n*1 (e.g., the digital processing circuit 110_1) and a first set of antennas $\{A_0(n1), A_1(n1), \ldots, A_{M-1}(n1), A_M(n1)\}$ (e.g., the antennas $\{A_0(1), A_1(1), \ldots, A_{M-1}(1), A_M(1)\}$), and may be arranged to perform first analog and radio frequency processing corresponding to the first predetermined radio frequency band BN(n1−1) (e.g., the predetermined radio frequency band BN(0)) for the wireless communications device 100. In addition, for the case that n=n2, a second digital processing circuit 110_*n*2 (e.g., the digital processing circuit 110_2) among the multiple digital processing circuits 110_1, 110_2, . . . and 110_N may be arranged to perform second digital processing corresponding to a second predetermined radio frequency band BN(n2−1) (e.g., the predetermined radio frequency band BN(1), which may be referred to as the radio frequency band BN1 for brevity) for the wireless communications device 100, where the second digital processing may comprise the common processing and a second additional processing. For example, a second analog and radio frequency circuit 120_*n*2 (e.g., the analog and radio frequency circuit 120_2) may be coupled between the second digital processing circuit 110_*n*2 (e.g., the digital processing circuit 110_2) and a second set of antennas $\{A_0(n2), A_1(n2), \ldots, A_{M-1}(n2), A_M(n2)\}$ (e.g., the antennas $\{A_0(2), A_1(2), \ldots, A_{M-1}(2), A_M(2)\}$), and may be arranged to perform second analog and radio frequency processing corresponding to the second predetermined radio frequency band BN(n2−1) (e.g., the predetermined radio frequency band BN(1)) for the wireless communications device 100. Additionally, the first digital processing circuit 110_*n*1 (e.g., the digital processing circuit 110_1) and the second digital processing circuit 110_*n*2 (e.g., the digital processing circuit 110_2) may be identical to each other, and may be arranged to perform the first digital processing and the second digital processing according to a first predetermined configuration and a second predetermined configuration, respectively.

The first digital processing circuit 110_*n*1 (e.g., the digital processing circuit 110_1) may comprise at least one first common circuit such as the common circuits $CC_0(n1)$, $CC_1(n1)$, and $CC_{M-1}(n1)$ (e.g., the common circuits $CC_0(1)$, $CC_1(1)$, . . . and $CC_{M-1}(1)$), and at least one first additional circuit such as the additional circuit AC(n1) (e.g., the additional circuit AC(1), where the aforementioned at least one first common circuit such as the common circuits $CC_0(n1)$, $CC_1(n1)$, . . . and $CC_{M-1}(n1)$ may perform the common processing among the first digital processing, and the aforementioned at least one first additional circuit such as the additional circuit AC(n1) may perform the first additional processing among the first digital processing. In addition, the second digital processing circuit 110_*n*2 (e.g., the digital processing circuit 110_2) may comprise at least one second common circuit such as the common circuits $CC_0(n2)$, $CC_1(n2)$, and $CC_{M-1}(n2)$ (e.g., the common circuits $CC_0(2)$, $CC_1(2)$, . . . and $CC_{M-1}(2)$), and at least one second additional circuit such as the additional circuit AC(n2) (e.g., the additional circuit AC(2), where the aforementioned at least one second common circuit such as the common circuits $CC_0(n2)$, $CC_1(n2)$, . . . and $CC_{M-1}(n2)$ may perform the common processing among the second digital processing, and the aforementioned at least one second additional circuit such as the additional circuit AC(n2) may perform the second additional processing among the second digital processing.

As the wireless device control circuit 110 may be equipped with the modularized internal circuit architecture, the aforementioned at least one first common circuit such as the common circuits $CC_0(n1)$, $CC_1(n1)$, . . . and $CC_{M-1}(n1)$ (e.g., the common circuits $CC_0(1)$, $CC_1(1)$, . . . and $CC_{M-1}$ (1)) and the aforementioned at least one second common circuit such as the common circuits $CC_0(n2)$, $CC_1(n2)$, . . . and $CC_{M-1}(n2)$ (e.g., the common circuits $CC_0(2)$, $CC_1(2)$, . . . and $CC_{M-1}(2)$) may be identical to each other, and the aforementioned at least one first additional circuit such as the additional circuit AC(n1) (e.g., the additional circuit AC(1) and the aforementioned at least one second additional circuit such as the additional circuit AC(n2) (e.g., the additional circuit AC(2) may be identical to each other. For example, at least one first selection circuit within the aforementioned at least one first additional circuit (e.g., the additional circuit AC(n1) such as the additional circuit AC(1)) may select one of multiple first partial circuits respectively corresponding to the multiple functions f1, . . . and fK within the aforementioned at least one first additional circuit according to the first predetermined configuration, for performing the first additional processing. For another example, at least one second selection circuit within the aforementioned at least one second additional circuit (e.g., the additional circuit AC(n2) such as the additional circuit AC(2)) may select one of multiple second partial circuits respectively corresponding to the multiple functions f1, . . . and fK within the aforementioned at least one second additional circuit according to the second predetermined configuration, for performing the second additional processing. As a result, the aforementioned at least one first additional circuit (e.g., the additional circuit AC(n1) such as the additional circuit AC(1)) and the aforementioned at least one second additional circuit (e.g., the additional circuit AC(n2) such as the additional circuit AC(2)) may be identical to each other, and may utilize the selected first partial circuit (e.g., the first partial circuit corresponding to a first function selected from the multiple functions f1, . . . and fK) among the multiple first partial circuits and the selected second partial circuit (e.g., the second partial circuit corresponding to a second function selected from the multiple functions f1, . . . and fK) among the multiple second partial circuits to perform the first additional processing and the second additional processing, respectively.

More particularly, all digital processing circuits $\{110\_n\}$ (e.g., the first digital processing circuit 110_*n*1 and the second digital processing circuit 110_*n*2) among the multiple digital processing circuits 110_1, 110_2, . . . and 110_N may be identical to each other. For example, each digital processing circuits 110_*n* of the aforementioned all digital processing circuits $\{110\_n\}$ may be configurable to select a partial circuit (e.g., the partial circuit corresponding to a certain function selected from the multiple functions f1, . . . and fK) among the multiple partial circuits respectively corresponding to the multiple functions f1, . . . and fK therein, and utilize the selected partial circuit to perform the associated additional processing (e.g., the processing of the selected function fk among the multiple functions f1, . . . and fK, with the symbol "k" being an integer falling within the range of the interval [1, K]). Based on the architecture shown in FIG. 1A, for the case that n=n3 (e.g., n3≠n2 and n3≠n1), a third digital processing circuit $110\_n3$ (e.g., the digital processing circuit $110\_N$) among the multiple digital processing circuits $110\_1$, $110\_2$, . . . and $110\_N$ may be arranged to perform third digital processing corresponding to a third predetermined radio frequency band BN(n3−1) (e.g., the predetermined radio frequency band BN(N−1), such as the predetermined radio frequency band BN(2) if N=3, which may be referred to as the radio frequency band BN2 for brevity) for the wireless communications device 100, where the third digital processing may comprise the common processing and a third additional processing. For example, a third digital processing circuit $120\_n3$ (e.g., the analog and radio frequency circuit $120\_N$) may be coupled between the third digital processing circuit $110\_n3$ (e.g., the digital processing circuit $110\_N$) and a third set of antennas $\{A_0(n3), A_1(n3), . . . , A_{M-1}(n3), A_M(n3)\}$ (e.g., the antennas $\{A_0(N), A_1(N), . . . , A_{M-1}(N), A_M(N)\}$), and may be arranged to perform third digital processing corresponding to the third predetermined radio frequency band BN(n3−1) (e.g., the predetermined radio frequency band BN(N−1)) for the wireless communications device 100. Additionally, the third digital processing circuit $110\_n3$ (e.g., the digital processing circuit $110\_N$) may be identical to the first digital processing circuit $110\_n1$ (e.g., the digital processing circuit $110\_1$) and the second digital processing circuit $110\_n2$ (e.g., the digital processing circuit $110\_2$), and may be arranged to perform the third digital processing according to a third predetermined configuration.

Figure 1B:
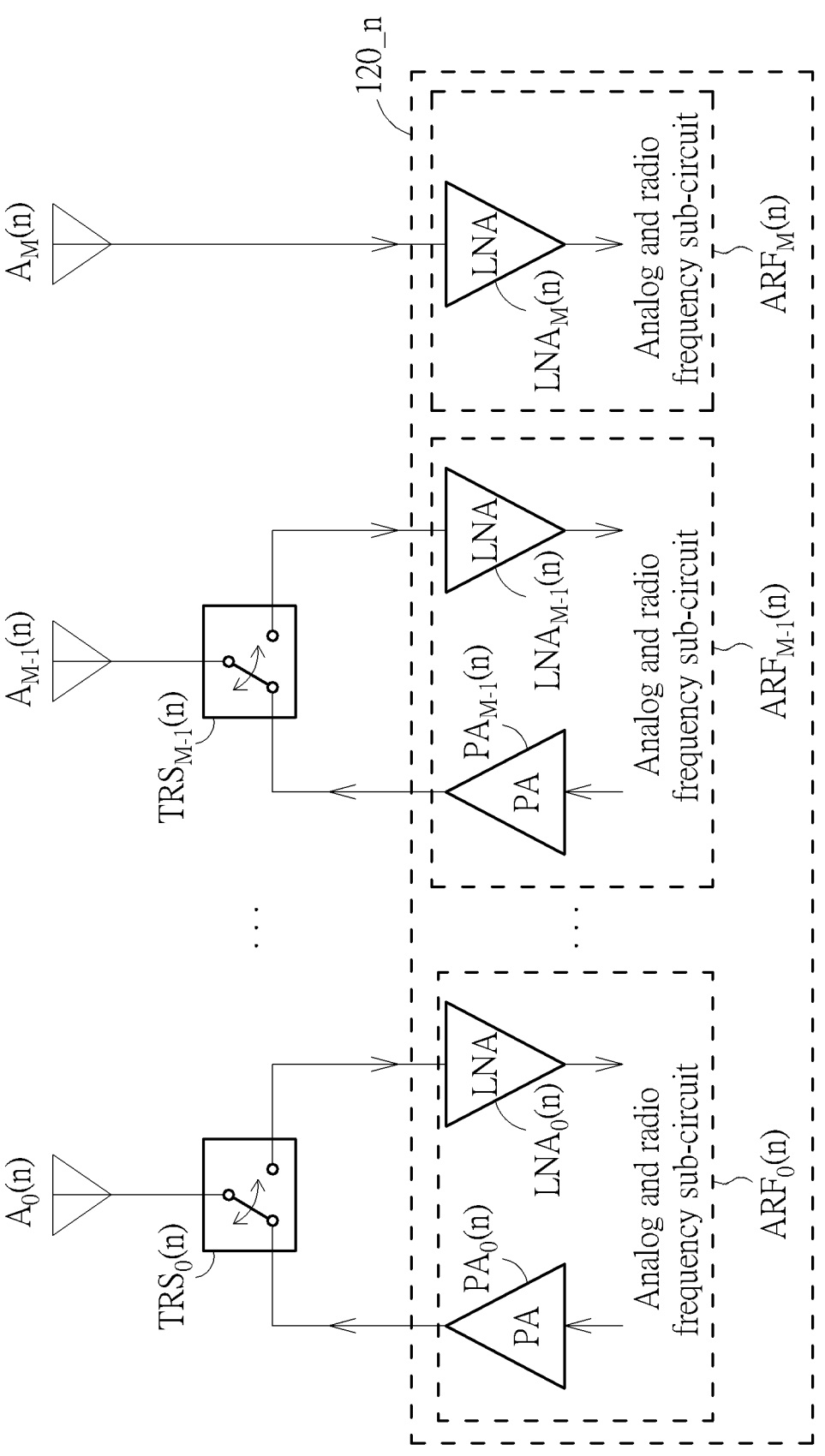
FIG. 1B is a diagram illustrating any analog and radio frequency circuit among multiple analog and radio frequency circuits (ARF CKT) within the wireless communications device shown in FIG. 1A as well as the associated antennas and transmitting/receiving (T/R) switches according to an embodiment of the present invention.

FIG. 1B is a diagram illustrating any analog and radio frequency circuit $120\_n$ among the multiple analog and radio frequency circuits $120\_1$, $120\_2$, . . . and $120\_N$ within the wireless communications device 100 shown in FIG. 1A as well as the associated antennas $\{A_0(n), A_{M-1}(n), A_M(n)\}$ and transmitting/receiving (T/R) switches $\{TRS_0(n), TRS_{M-1}(n)\}$ according to an embodiment of the present invention. The analog and radio frequency circuit $120\_n$ may comprise multiple analog and radio frequency sub-circuits $\{ARF_0(n), ARF_{M-1}(n)\}$ respectively corresponding to the common circuits $CC_0(n)$, $CC_1(n)$, . . . and $CC_{M-1}(n)$ of the corresponding digital processing circuit $110\_n$ (e.g., the digital processing circuit $110\_n$ coupled to the aforementioned any analog and radio frequency circuit $120\_n$), and further comprise an additional analog and radio frequency sub-circuit $ARF_M(n)$ corresponding to the additional circuit AC(n) of the corresponding digital processing circuit $110\_n$.

The analog and radio frequency sub-circuits $\{ARF_0(n), . . . , ARF_{M-1}(n), ARF_M(n)\}$ may comprise multiple amplifiers such as power amplifiers and low noise amplifiers (respectively labeled "PA" and "LNA" in FIG. 1B for brevity), for amplifying signals on multiple transmitting/receiving paths. More particularly, any analog and radio frequency sub-circuit $ARF_m(n)$ among the multiple analog and radio frequency sub-circuits $\{ARF_0(n), . . . , ARF_{M-1}(n)\}$ may comprise a power amplifier $PA_m(n)$ on at least one transmitting path passing through the analog and radio frequency sub-circuit $ARF_m(n)$, and further comprise a low noise amplifier $LNA_M(n)$ on at least one receiving path passing through the analog and radio frequency sub-circuit $ARF_m(n)$. As shown in the lower left part of FIG. 1B, when m=0, the analog and radio frequency sub-circuit $ARF_0(n)$ may comprise a power amplifier $PA_0(n)$ on the transmitting path passing through the analog and radio frequency sub-circuit $ARF_0(n)$, and further comprise a low noise amplifier $LNA_0(n)$ on the receiving path passing through the analog and radio frequency sub-circuit $ARF_0(n)$; and the rest may be deduced by analogy, for example, when m=(M−1), the analog and radio frequency sub-circuit $ARF_{M-1}(n)$ may comprise a power amplifier $PA_{M-1}(n)$ on the transmitting path passing through the analog and radio frequency sub-circuit $ARF_{M-1}(n)$, and further comprise a low noise amplifier $LNA_{M-1}(n)$ on the receiving path passing through the analog and radio frequency sub-circuit $ARF_{M-1}(n)$. As shown in the lower right part of FIG. 1B, the additional analog and radio frequency sub-circuit $ARF_M(n)$ may comprise a low noise amplifier $LNA_M(n)$ on at least one receiving path passing through the analog and radio frequency sub-circuit $ARF_M(n)$.

In the architecture shown in FIG. 1B, the multiple amplifiers such as the power amplifiers $\{PA_0(n), . . . , PA_{M-1}(n)\}$ and the low noise amplifiers $\{LNA_0(n), . . . , LNA_{M-1}(n), LNA_M(n)\}$ may be implemented within the analog and radio frequency circuit $120\_n$ (e.g., an integrated circuit (IC)), but the present invention is not limited thereto. According to some embodiments, the multiple amplifiers such as the power amplifiers $\{PA_0(n), PA_{M-1}(n)\}$ and the low noise amplifiers $\{LNA_0(n), . . . , LNA_{M-1}(n), LNA_M(n)\}$ may be implemented outside the analog and radio frequency circuit $120\_n$, and more particularly, may be implemented within another circuit (e.g., another IC).

Figure 1C:
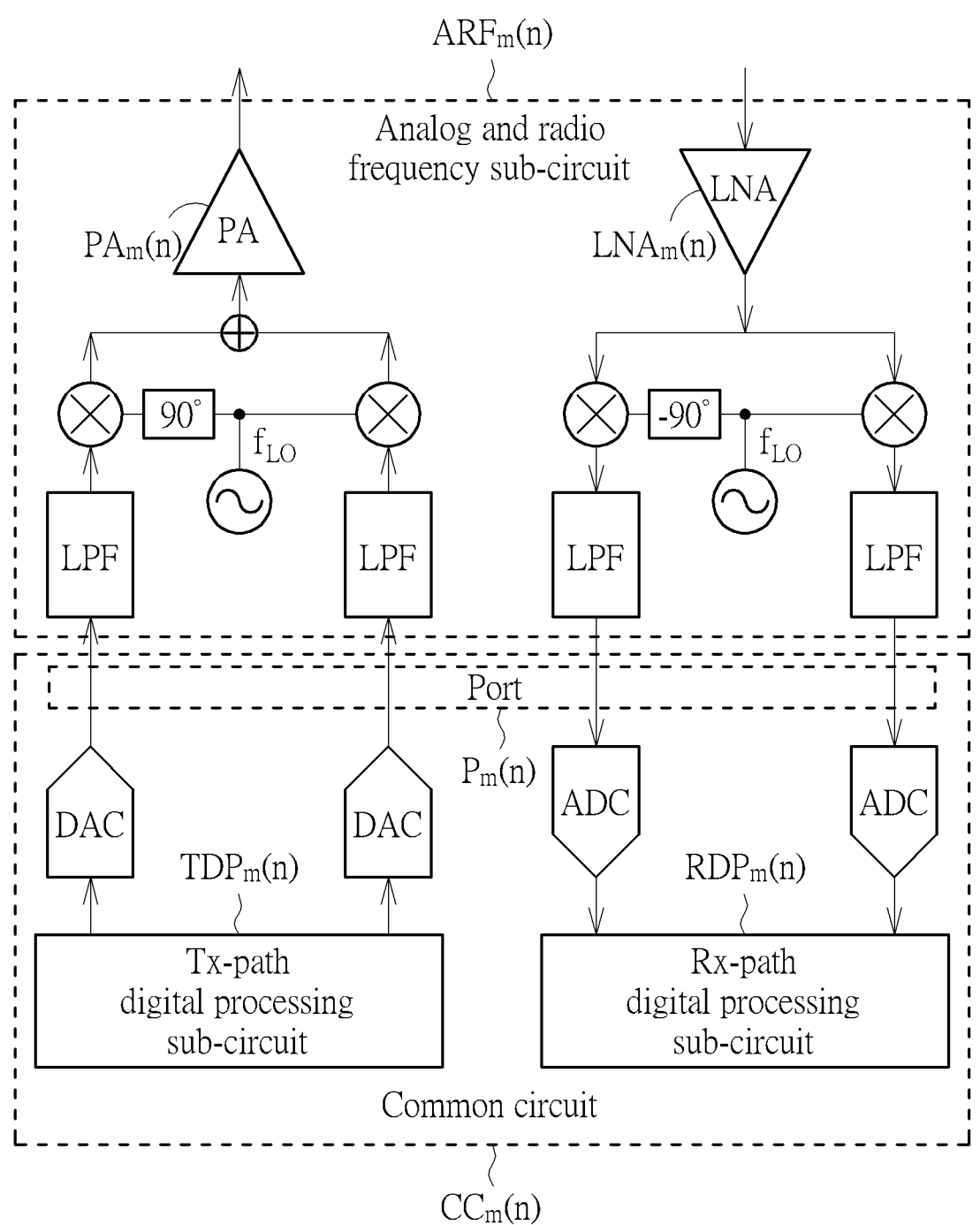
FIG. 1C is a diagram illustrating some implementation details of an analog and radio frequency sub-circuit among multiple analog and radio frequency sub-circuits within the analog and radio frequency circuit shown in FIG. 1B as well as the associated common circuit of a corresponding digital processing circuit (DP CKT) within the wireless communications device shown in FIG. 1A according to an embodiment of the present invention.

FIG. 1C is a diagram illustrating some implementation details of the aforementioned any analog and radio frequency sub-circuit $ARF_m(n)$ among the multiple analog and radio frequency sub-circuits $\{ARF_0(n), . . . , ARF_{M-1}(n)\}$ within the analog and radio frequency circuit $120\_n$ shown in FIG. 1B as well as the associated common circuit $CC_m(n)$ of the corresponding digital processing circuit $110\_n$ within the wireless communications device 100 shown in FIG. 1A according to an embodiment of the present invention, but the present invention is not limited thereto. According to some embodiments, the architecture shown in FIG. 1C may vary.

As shown in the left half part of FIG. 1C, starting from the bottommost, the transmitting-path (Tx-path) components on the aforementioned at least one transmitting path passing through the analog and radio frequency sub-circuit $ARF_m(n)$ may comprise a Tx-path digital processing sub-circuit $TDP_m(n)$, digital-to-analog converters (DACs), low-pass filters (LPFs), a local oscillator (LO) outputting a clock signal with a predetermined LO frequency $f_{LO}$, a phase shifter (labeled "90°" for brevity), mixers (labeled "x" for brevity), a summation circuit (labeled "+") and the power amplifier $PA_m(n)$, where the Tx-path digital processing sub-circuit $TDP_m(n)$ and the DACs may be implemented within the common circuit $CC_m(n)$ of the digital processing circuit $110\_n$, to allow the Tx-path digital processing sub-circuit $TDP_m(n)$ to perform baseband processing regarding the aforementioned at least one transmitting path digitally, and the remaining components among the Tx-path components listed above may be implemented within the analog and radio frequency sub-circuit $ARF_m(n)$, and may be coupled to the DACs through a port $P_m(n)$ of the common circuit $CC_m(n)$ to receive a set of Tx-path baseband in-phase/quadrature-phase (I/Q) signals from the DACs in the common circuit $CC_m(n)$, but the present invention is not limited thereto. For example, the I signal and the Q signal among the set of Tx-path baseband FQ signals may be implemented as differential signals, respectively, and the DACs among the Tx-path components may comprise four DACs, including two DACs for transmitting the I differential signals among the set of Tx-path baseband FQ signals to the analog and radio frequency sub-circuit $ARF_m(n)$ and the other two DACs for transmitting the Q differential signals among the set of Tx-path baseband FQ signals to the analog and radio frequency sub-circuit $ARF_m(n)$.

As shown in the right half part of FIG. 1C, starting from the uppermost, the receiving-path (Rx-path) components on the aforementioned at least one receiving path passing through the analog and radio frequency sub-circuit $ARF_m(n)$ may comprise the low noise amplifier $LNA_m(n)$, another local oscillator (LO) outputting another clock signal with the predetermined LO frequency $f_{LO}$, another phase shifter (labeled "–90°" for brevity), other mixers (labeled "x" for brevity), other LPFs, analog-to-digital converters (ADCs) and a Rx-path digital processing sub-circuit $RDP_m(n)$, where the Rx-path digital processing sub-circuit $RDP_m(n)$ and the ADCs may be implemented within the common circuit $CC_m(n)$ of the digital processing circuit $110\_n$, to allow the Rx-path digital processing sub-circuit $RDP_m(n)$ to perform baseband processing regarding the aforementioned at least one receiving path digitally, and the remaining components among the Rx-path components listed above may be implemented within the analog and radio frequency sub-circuit $ARF_m(n)$, and may be coupled to the ADCs through the port $P_m(n)$ of the common circuit $CC_m(n)$ to transmit a set of Rx-path baseband FQ signals to the ADCs in the common circuit $CC_m(n)$, but the present invention is not limited thereto. For example, the I signal and the Q signal among the set of Rx-path baseband FQ signals may be implemented as differential signals, respectively, and the ADCs among the Rx-path components may comprise four ADCs, including two ADCs for receiving the I differential signals among the set of Rx-path baseband FQ signals from the analog and radio frequency sub-circuit $ARF_m(n)$ and the other two ADCs for receiving the Q differential signals among the set of Rx-path baseband FQ signals from the analog and radio frequency sub-circuit $ARF_m(n)$.

Figure 1D:
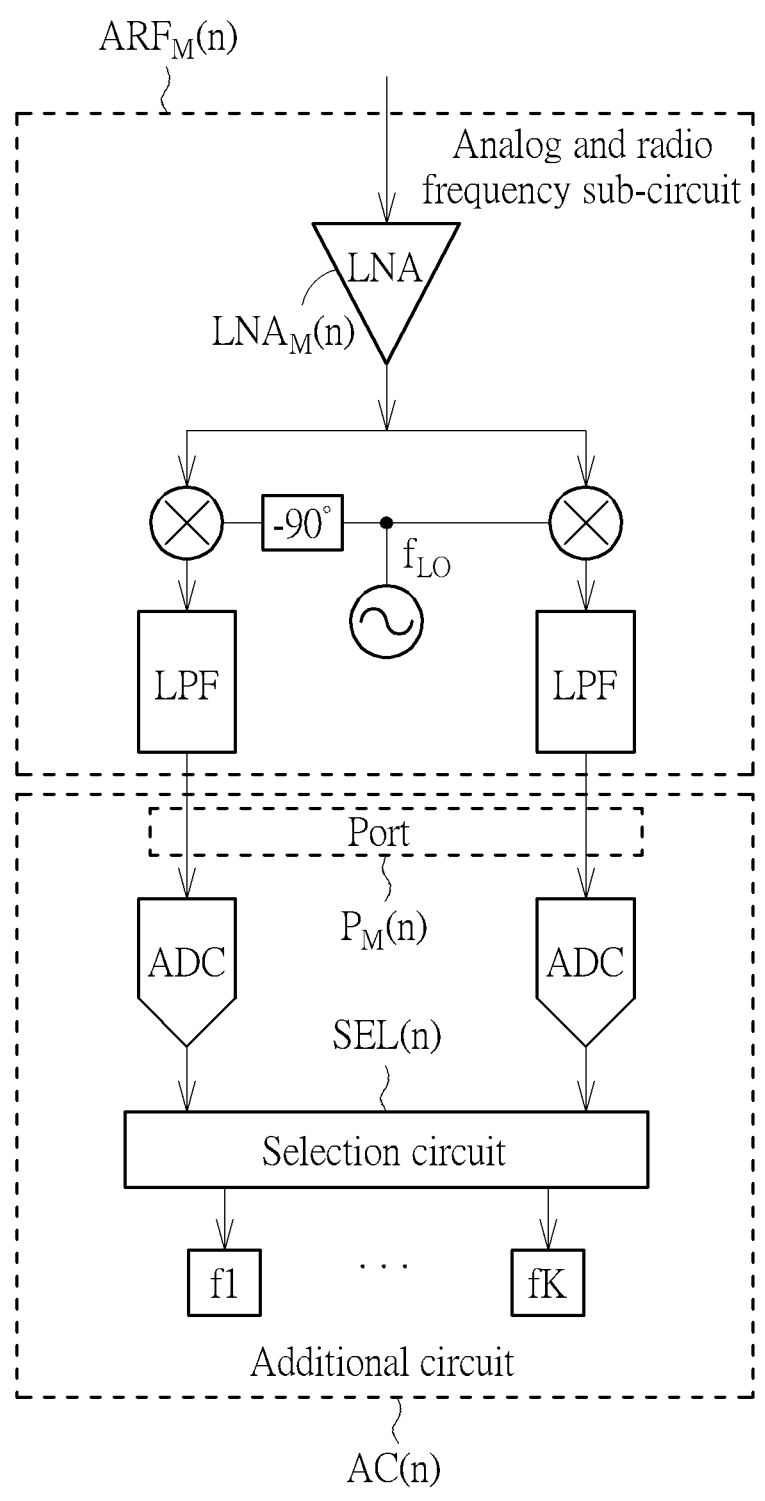
FIG. 1D is a diagram illustrating some implementation details of an additional analog and radio frequency sub-circuit within the analog and radio frequency circuit shown in FIG. 1B as well as the associated additional circuit of the corresponding digital processing circuit within the wireless communications device shown in FIG. 1A according to an embodiment of the present invention.

FIG. 1D is a diagram illustrating some implementation details of the additional analog and radio frequency sub-circuit $ARF_M(n)$ within the analog and radio frequency circuit $120\_n$ shown in FIG. 1B as well as the associated additional circuit AC(n) of the corresponding digital processing circuit $110\_n$ within the wireless communications device 100 shown in FIG. 1A according to an embodiment of the present invention, but the present invention is not limited thereto. According to some embodiments, the architecture shown in FIG. 1D may vary.

For better comprehension, assume that a certain function (e.g., the function f2) among the multiple functions f1, . . . and fK may be enabled to act in a same manner as that of the Rx-path digital processing sub-circuit $RDP_m(n)$ shown in the lower right part of FIG. 1C, where the architecture shown in FIG. 1D under this configuration may be similar to or the same as the architecture shown in the right half part of FIG. 1C, but the present invention is not limited thereto. For example, another function (e.g., the function f1 or the function fK) among the multiple functions f1, . . . and fK may be enabled to act in a different manner, for performing different processing. As shown in FIG. 1D, starting from the uppermost, the Rx-path components on the aforementioned at least one receiving path passing through the analog and radio frequency sub-circuit $ARF_M(n)$ may comprise the low noise amplifier $LNA_M(n)$, a local oscillator (LO) outputting yet another clock signal with the predetermined LO frequency $f_{LO}$, a phase shifter (labeled "–90°" for brevity), mixers (labeled "x" for brevity), LPFs, ADCs as well as a function-configurable architecture, and the function-configurable architecture may comprise the aforementioned multiple partial circuits respectively corresponding to the multiple functions f1, . . . and fK, and further comprise at least one selection circuit, which may be collectively referred to as the selection circuit SEL(n), where the multiple partial circuits respectively corresponding to the multiple functions f1, . . . and fK, the selection circuit SEL(n) and the ADCs may be implemented within the additional circuit AC(n) of the digital processing circuit $110\_n$, and the remaining components among the Rx-path components listed above may be implemented within the analog and radio frequency sub-circuit $ARF_M(n)$, and may be coupled to the ADCs through the port $P_M(n)$ of the additional circuit AC(n) to transmit a set of Rx-path baseband I/Q signals to the ADCs in the additional circuit AC(n), but the present invention is not limited thereto. For example, the I signal and the Q signal among the set of Rx-path baseband I/Q signals may be implemented as differential signals, respectively, and the ADCs among the Rx-path components may comprise four ADCs, including two ADCs for receiving the I differential signals among the set of Rx-path baseband I/Q signals from the analog and radio frequency sub-circuit $ARF_M(n)$ and the other two ADCs for receiving the Q differential signals among the set of Rx-path baseband I/Q signals from the analog and radio frequency sub-circuit $ARF_M(n)$.

Some implementation details regarding the function-configurable architecture (e.g., the configurable architecture comprising the selection circuit SEL(n) and the multiple partial circuits respectively corresponding to the multiple functions f1, . . . and fK) may be described as follows. According to some embodiments, the modularized internal circuit architecture of the wireless device control circuit 110 may comprise multiple identical modularized internal circuits such as the multiple digital processing circuits $110\_1$, $110\_2$, . . . and $110\_N$ that are identical to each other, and any modularized internal circuit among the multiple identical modularized internal circuits, such as the aforementioned any digital processing circuit $110\_n$ among the multiple digital processing circuits $110\_1$, $110\_2$, . . . and $110\_N$, may be equipped with the function-configurable architecture, in order to provide the aforementioned selected function fk among the multiple functions f1, . . . and fK. With the aid of function-configurable architecture, the aforementioned any modularized internal circuit such as the aforementioned any digital processing circuit $110\_n$ may be configurable, and more particularly, may utilize the selection circuit SEL(n) to select a certain partial circuit (e.g., the partial circuit corresponding to a certain function selected from the multiple functions f1, . . . and fK) among the multiple partial circuits respectively corresponding to the multiple functions f1, . . . and fK therein, and utilize the selected partial circuit to perform the associated additional processing (e.g., the processing of the selected function fk among the multiple functions f1, . . . and fK). As a result, the wireless device control circuit 110 may perform different operations with the multiple identical modularized internal circuits (e.g., the multiple digital processing circuits $110\_1$, $110\_2$, . . . and $110\_N$) according to different predetermined configurations, respectively, without hindering any function of the wireless communications device 100.

The additional circuit AC(n) in the aforementioned any digital processing circuit $110\_n$ may comprise the multiple partial circuits respectively corresponding to the multiple functions f1, . . . and fK, such as the partial circuits #1, . . . and #K (which may be illustrated with the blocks of the multiple functions f1, . . . and fK in FIG. 1D for brevity), for performing the processing #1, . . . and #K of the multiple functions f1, . . . and fK, respectively, and further comprise the aforementioned at least one selection circuit such as the selection circuit SEL(n) coupled to the multiple partial circuits as shown in FIG. 1D, for enabling the aforementioned selected function fk (e.g., the function fk selected from the multiple functions f1, . . . and fK) according to the associated predetermined configuration #n of the digital processing circuit 110_n. Assuming that the symbols "k1" and "k2" may represent different integers falling within the range of the interval [1, K], two partial circuits #k1 and #k2 among the multiple partial circuits (e.g., the partial circuits #1, . . . and #K) are capable of performing different additional processing fk1 and fk2 (e.g., the first additional processing and the second additional processing) corresponding to different functions fk1 and fk2, respectively, and the aforementioned at least one selection circuit such as the selection circuit SEL(n) may select one of the two partial circuits #k1 and #k2 according to the associated predetermined configuration #n to be the selected partial circuit #k corresponding to the aforementioned selected function fk, for performing the associated additional processing #k.

For example, the additional circuit AC(n1) (e.g., the additional circuit AC(1)) in the first digital processing circuit 110_n1 (e.g., the digital processing circuit 110_1) may comprise the multiple first partial circuits respectively corresponding to the multiple functions f1, . . . and fK, such as the first partial circuits #1, . . . and #K, and the aforementioned at least one first selection circuit such as the selection circuit SEL(n1) (e.g., the selection circuit SEL(1)) coupled to the multiple first partial circuits, where two first partial circuits #k1 and #k2 among the multiple first partial circuits are capable of performing the first additional processing and the second additional processing such as the additional processing #k1 and #k2, respectively, and the aforementioned at least one first selection circuit such as the selection circuit SEL(n1) (e.g., the selection circuit SEL(1)) may select one of the two first partial circuits #k1 and #k2 according to the first predetermined configuration such as the predetermined configuration #n1, for performing the first additional processing such as the additional processing #k1. For another example, the additional circuit AC(n2) (e.g., the additional circuit AC(2) in the second digital processing circuit 110_n2 (e.g., the digital processing circuit 110_2) may comprise the multiple second partial circuits respectively corresponding to the multiple functions f1, . . . and fK, such as the second partial circuits #1, . . . and #K, and the aforementioned at least one second selection circuit such as the selection circuit SEL(n2) (e.g., the selection circuit SEL(2)) coupled to the multiple second partial circuits, where two second partial circuits #k1 and #k2 among the multiple second partial circuits are capable of performing the first additional processing and the second additional processing such as the additional processing #k1 and #k2, respectively, and the aforementioned at least one second selection circuit such as the selection circuit SEL(n2) (e.g., the selection circuit SEL(2)) may select one of the two second partial circuits #k1 and #k2 according to the second predetermined configuration such as the predetermined configuration #n2, for performing the second additional processing such as the additional processing #k2. For brevity, similar descriptions for these embodiments are not repeated in detail here.

According to some embodiments, the aforementioned at least one selection circuit such as the selection circuit SEL(n) may be implemented by way of one or a combination of a multiplexer, a de-multiplexer, etc. For brevity, similar descriptions for these embodiments are not repeated in detail here.

According to some embodiments, the aforementioned any digital processing circuit 110_n corresponding to the predetermined radio frequency band BN(n−1) may comprise multiple ADCs such as the ADCs in the common circuits $CC_0(n)$, $CC_1(n)$, . . . and $CC_{M-1}(n)$ thereof (e.g., the ADCs in the common circuit $CC_m(n)$ shown in FIG. 1C, where m=0, 1, . . . or (M−1)) that are coupled to multiple antennas (e.g., the M antennas $\{A_0(n), A_1(n), \ldots, A_{M-1}(n)\}$ corresponding to the common circuits $CC_0(n)$, $CC_1(n)$, . . . and $CC_{M-1}(n)$ as shown in FIG. 1A) through the analog and radio frequency circuit 120_n corresponding to the predetermined radio frequency band BN(n−1), and further comprise at least one additional ADC such as the ADC in the additional circuit AC(n) (e.g., the ADCs in the additional circuit AC(n) shown in FIG. 1D), where the multiple ADCs may perform multiple analog-to-digital conversion operations on multiple signal paths (e.g., the receiving paths passing through the analog and radio frequency sub-circuits $\{ARF_0(n), \ldots, ARF_{M-1}(n)\}$) coupled to the multiple antennas, respectively, and the aforementioned at least one additional ADC may perform at least one additional analog-to-digital conversion operation on at least one additional signal path (e.g., the receiving path passing through the analog and radio frequency sub-circuit $ARF_M(n)$), for performing the associated additional processing #k. For example, for the first case that n=n1 and k=k1, the digital processing circuit 110_n may represent the first digital processing circuit 110_n1 (e.g., the digital processing circuit 110_1), and the associated additional processing #k may represent the first additional processing such as the additional processing #k1); and for the second case that n=n2 and k=k2, the digital processing circuit 110_n may represent the second digital processing circuit 110_n2 (e.g., the digital processing circuit 110_2), and the associated additional processing #k may represent the second additional processing such as the additional processing #k2. For brevity, similar descriptions for these embodiments are not repeated in detail here.

According to some embodiments, the associated additional processing #k (e.g., k=1, 2, . . . or K) may comprise one or a combination of the following operations:

(1) a packet-receiving and sensitivity enhancement operation: receiving packets to increase receiver sensitivity, for example, by performing the MRC mentioned above;

(2) a radar detection and dynamic frequency selection (DFS) operation: performing radar detection on a current channel in the predetermined radio frequency band BN(n−1) to perform DFS, and more particularly, when a radar signal is detected on the current channel, select a new channel from multiple channels in the predetermined radio frequency band BN(n−1) to be a selected channel for performing wireless communications and automatically switch from the current channel to the selected channel, in order to prevent interfering with the radar;

(3) a spectrum monitoring (SM) operation: performing SM on other channels in the predetermined radio frequency band BN(n−1) to scan the traffic congestion of the other channels, for example, if the current channel has too many users and traffic congestion occurs, performing the SM can help the AP to jump to a clean channel in time; and (4) an on-the-fly (OTF) calibration operation: performing OTF calibration on any Tx-path component among the Tx-path components on the aforementioned at least one transmitting path passing through the analog and radio frequency sub-circuit ARFm(n) according to a loop-back signal obtained from a loop-back-configurable architecture within the wireless communications device 100 shown in FIG. 1A, where the loop-back signal may be equal to an input/output signal (e.g., an input signal or an output signal) of the aforementioned any Tx-path component;

where the processing #1, . . . and #K of the multiple functions f1, . . . and fK may comprise all operations among the operations listed above, but the present invention is not limited thereto. According to some embodiments, the associated additional processing #k and/or the processing #1, . . . and #K of the multiple functions f1, . . . and fK may vary. In addition, the aforementioned at least one selection circuit such as the selection circuit SEL(n) may select one of the partial circuits #1, . . . and #K according to the associated predetermined configuration #n to be the selected partial circuit #k corresponding to the aforementioned selected function fk, for performing the associated additional processing #k. Based on the associated predetermined configuration #n, the wireless device control circuit 110 may further control the associated signal paths of the wireless communications device 100 as follows:

(1) if the associated additional processing #k comprises receiving the packets to increase the receiver sensitivity, the aforementioned at least one additional ADC such as the ADC in the additional circuit AC(n) (e.g., the ADCs in the additional circuit AC(n) shown in FIG. 1D) may be coupled to another antenna (e.g., the (M+1)th antenna AM(n) among the (M+1) antennas {A0($n$), A1($n$), . . . , AM−1(n), AM(n)}) through the analog and radio frequency circuit 120_$n$ corresponding to the predetermined radio frequency band BN(n−1);

(2) if the associated additional processing #k comprises performing the radar detection to perform the DFS or performing the SM in the predetermined radio frequency band BN(n−1), the aforementioned at least one additional ADC such as the ADC in the additional circuit AC(n) (e.g., the ADCs in the additional circuit AC(n) shown in FIG. 1D) may be coupled to a printed circuit board (PCB) antenna through the analog and radio frequency circuit 120_$n$ corresponding to the predetermined radio frequency band BN(n−1); and (3) if the associated additional processing #k comprises performing the OTF calibration, the OTF calibration may be performed according to the loop-back signal, rather than any received signal from any antenna (e.g., any antenna among the (M+1) antennas {A0($n$), A1($n$), . . . , AM−1(n), AM(n)}), where the loop-back signal may be equal to any signal among the input signal and the output signal of the aforementioned any Tx-path component on the aforementioned at least one transmitting path passing through the analog and radio frequency sub-circuit ARFm(n) (or passing through the analog and radio frequency circuit 120_$n$ comprising the analog and radio frequency sub-circuit ARFm(n)); but the present invention is not limited thereto. For brevity, similar descriptions for these embodiments are not repeated in detail here.

Figure 1E:
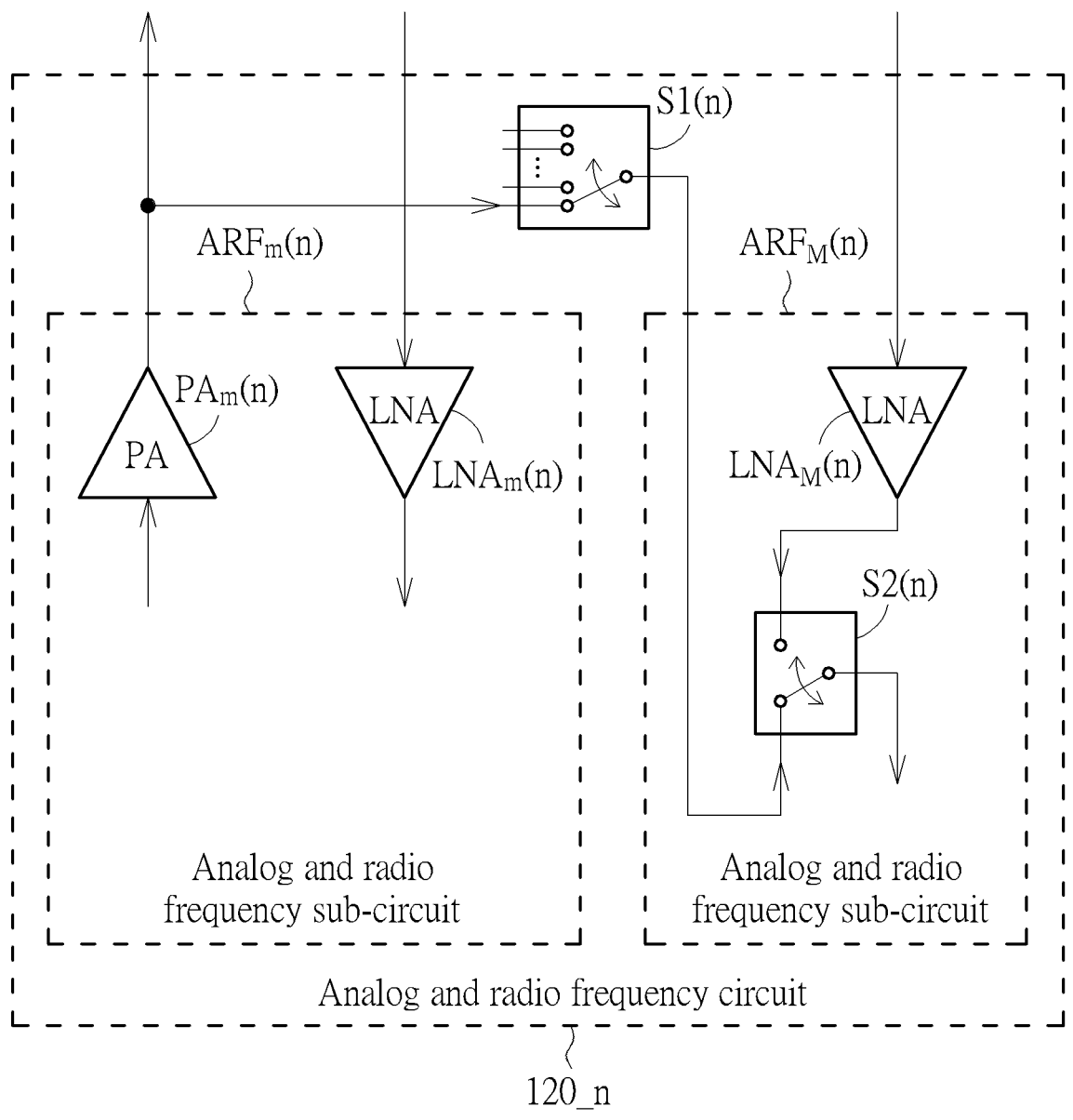
FIG. 1E is a diagram illustrating some implementation details of a loop-back-configurable architecture within the wireless communications device shown in FIG. 1A according to an embodiment of the present invention.

FIG. 1E is a diagram illustrating some implementation details of the loop-back-configurable architecture within the wireless communications device 100 shown in FIG. 1A according to an embodiment of the present invention. The aforementioned any analog and radio frequency circuit 120_$n$ may comprise a first switch S1($n$) coupled to the output terminal of the power amplifier PA$_m$(n), and further comprise a second switch S2($n$) coupled between the first switch S1($n$) and the mixers of the analog and radio frequency sub-circuit ARF$_M$(n), for providing the loop-back-configurable architecture with a loop-back path between the output terminal of the power amplifier PA$_m$(n) and the mixers of the analog and radio frequency sub-circuit ARF$_M$(n). For example, multiple first input terminals of the first switch S1($n$) may be coupled to the respective output terminals of the power amplifiers PA$_0$(n), . . . and PA$_{M-1}$(n), and the first switch S1($n$) may be arranged to select one of the power amplifiers PA$_0$(n), . . . and PA$_{M-1}$(n) to be the power amplifier PA$_m$(n) shown in FIG. 1E, and more particularly, make the output terminal of the first switch S1($n$) be electrically connected to a corresponding first input terminal (e.g., the first input terminal that is coupled to the output terminal of the power amplifier PA$_m$(n)) among the multiple first input terminals, in order to receive the output signal at the output terminal of the power amplifier PA$_m$(n) to be the output signal of the first switch S1($n$), for being sent to the mixers of the analog and radio frequency sub-circuit ARF$_M$(n) through the second switch S2($n$). In addition, multiple second input terminals of the second switch S2($n$) may be coupled to the respective output terminals of the first switch S1($n$) and the low noise amplifier LNA$_M$(n), and the second switch S2($n$) may be arranged to select any output signal among the respective output signals of the first switch S1($n$) and the low noise amplifier LNA$_M$(n) to be the output signal of the second switch S2($n$).

For example, according to a loop-back configuration, the second switch S2($n$) may select the output signal of the first switch S1($n$) to be the output signal of the second switch S2($n$), and make the output terminal of the second switch S2($n$) be electrically connected to a corresponding second input terminal (e.g., the second input terminal that is coupled to the output terminal of the first switch S1($n$)) among the multiple second input terminals, in order to receive the output signal at the output terminal of the first switch S1($n$) to be the output signal of the second switch S2($n$), for being sent to the mixers of the analog and radio frequency sub-circuit ARF$_M$(n), where the output signal of the second switch S2($n$) may be equivalent to the output signal of the power amplifier PA$_m$(n), but the present invention is not limited thereto. For another example, according to a non-loop-back configuration, the second switch S2($n$) may select the output signal of the low noise amplifier LNA$_M$(n) to be the output signal of the second switch S2($n$), and make the output terminal of the second switch S2($n$) be electrically connected to another corresponding second input terminal (e.g., the second input terminal that is coupled to the output terminal of the low noise amplifier LNA$_M$(n)) among the multiple second input terminals, in order to receive the output signal at the output terminal of the low noise amplifier LNA$_M$(n) to be the output signal of the second switch S2($n$), for being sent to the mixers of the analog and radio frequency sub-circuit ARF$_M$(n).

Figure 1F:
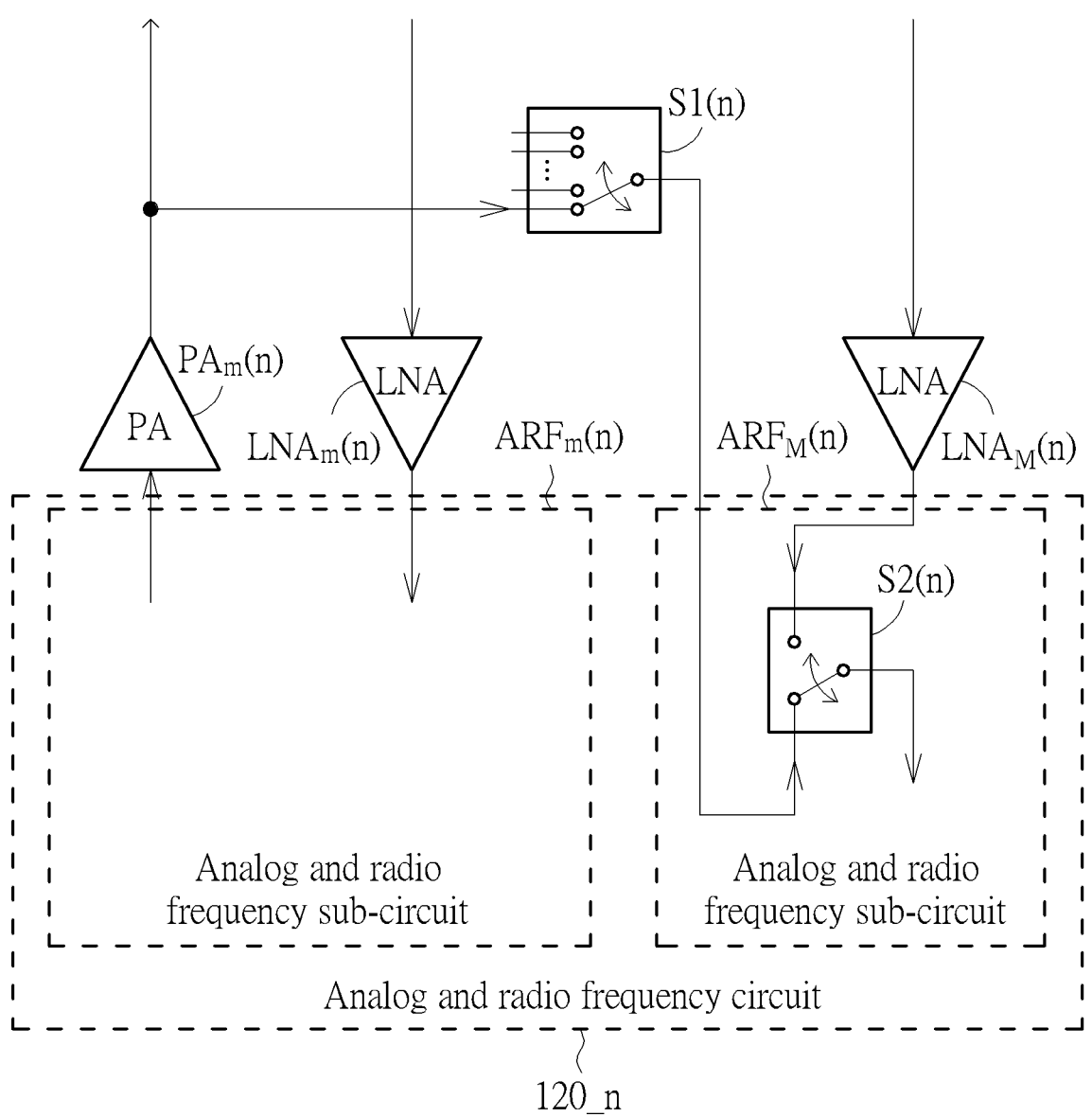
FIG. 1F is a diagram illustrating some implementation details of the loop-back-configurable architecture within the wireless communications device shown in FIG. 1A according to another embodiment of the present invention.

FIG. 1F is a diagram illustrating some implementation details of the loop-back-configurable architecture within the wireless communications device 100 shown in FIG. 1A according to another embodiment of the present invention. In comparison with the embodiment shown in FIG. 1E, the first switch S1($n$) in the loop-back-configurable architecture of this embodiment may be positioned outside the aforementioned any analog and radio frequency circuit 120_$n$, where the power amplifier PA$_m$(n) (e.g., the power amplifiers {PA$_0$(n), . . . , PA$_{M-1}$(n)}), the low noise amplifier LNA$_m$(n) (e.g., the low noise amplifiers {LNA$_0$(n), . . . , LNA$_{M-1}$(n)}) as well as the low noise amplifier LNA$_M$(n) may also be positioned outside the analog and radio frequency circuit 120_$n$, and more particularly, may be implemented within at least one other circuit (e.g., at least one other IC such as the aforementioned another IC). For brevity, similar descriptions for this embodiment are not repeated in detail here.

Figure 1G:
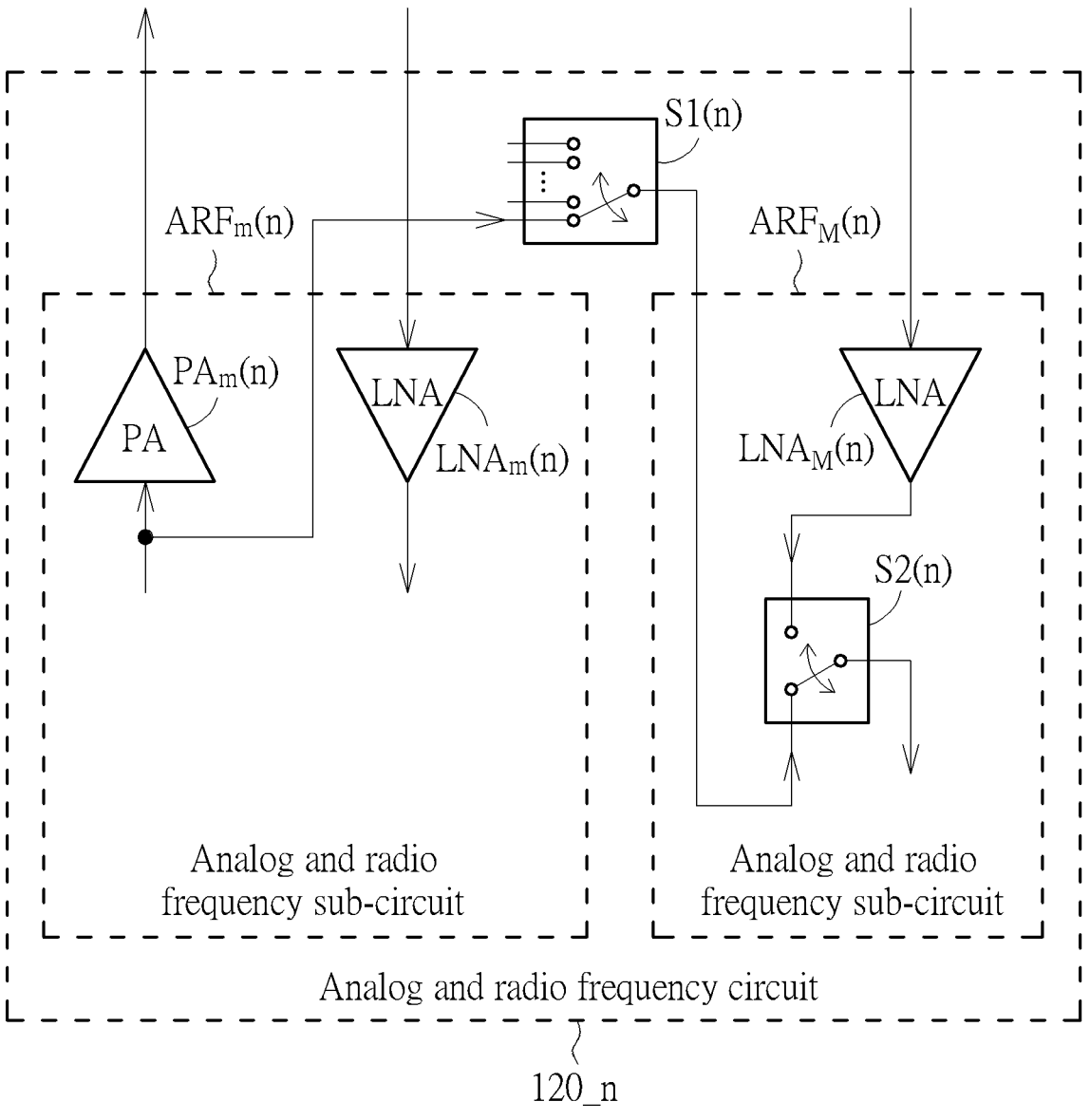
FIG. 1G is a diagram illustrating some implementation details of the loop-back-configurable architecture within the wireless communications device shown in FIG. 1A according to yet another embodiment of the present invention.

FIG. 1G is a diagram illustrating some implementation details of the loop-back-configurable architecture within the wireless communications device 100 shown in FIG. 1A according to yet another embodiment of the present invention. In comparison with the embodiment shown in FIG. 1E, the first switch $S1(n)$ in the loop-back-configurable architecture of this embodiment may be coupled to the input terminal of the power amplifier $PA_m(n)$, and the loop-back path in this loop-back-configurable architecture may start from the input terminal of the power amplifier $PA_m(n)$, rather than starting from the output terminal of the power amplifier $PA_m(n)$. For example, the multiple first input terminals of the first switch $S1(n)$ may be coupled to the respective input terminals of the power amplifiers $PA_0(n), \ldots$ and $PA_{M-1}(n)$, and the first switch $S1(n)$ may be arranged to select one of the power amplifiers $PA_0(n), \ldots$ and $PA_{M-1}(n)$ to be the power amplifier $PA_m(n)$ shown in FIG. 1G, and more particularly, make the output terminal of the first switch $S1(n)$ be electrically connected to a corresponding first input terminal (e.g., the first input terminal that is coupled to the input terminal of the power amplifier $PA_m(n)$) among the multiple first input terminals, in order to receive the input signal at the input terminal of the power amplifier $PA_m(n)$ to be the output signal of the first switch $S1(n)$, for being sent to the mixers of the analog and radio frequency sub-circuit $ARF_M(n)$ through the second switch $S2(n)$. In addition, the multiple second input terminals of the second switch $S2(n)$ may be coupled to the respective output terminals of the first switch $S1(n)$ and the low noise amplifier $LNA_M(n)$, and the second switch $S2(n)$ may be arranged to select any output signal among the respective output signals of the first switch $S1(n)$ and the low noise amplifier $LNA_M(n)$ to be the output signal of the second switch $S2(n)$.

For example, according to the loop-back configuration, the second switch $S2(n)$ may select the output signal of the first switch $S1(n)$ to be the output signal of the second switch $S2(n)$, and make the output terminal of the second switch $S2(n)$ be electrically connected to a corresponding second input terminal (e.g., the second input terminal that is coupled to the output terminal of the first switch $S1(n)$) among the multiple second input terminals, in order to receive the output signal at the output terminal of the first switch $S1(n)$ to be the output signal of the second switch $S2(n)$, for being sent to the mixers of the analog and radio frequency sub-circuit $ARF_M(n)$, where the output signal of the second switch $S2(n)$ may be equivalent to the input signal of the power amplifier $PA_m(n)$, but the present invention is not limited thereto. For brevity, similar descriptions for this embodiment are not repeated in detail here.

Figure 2:
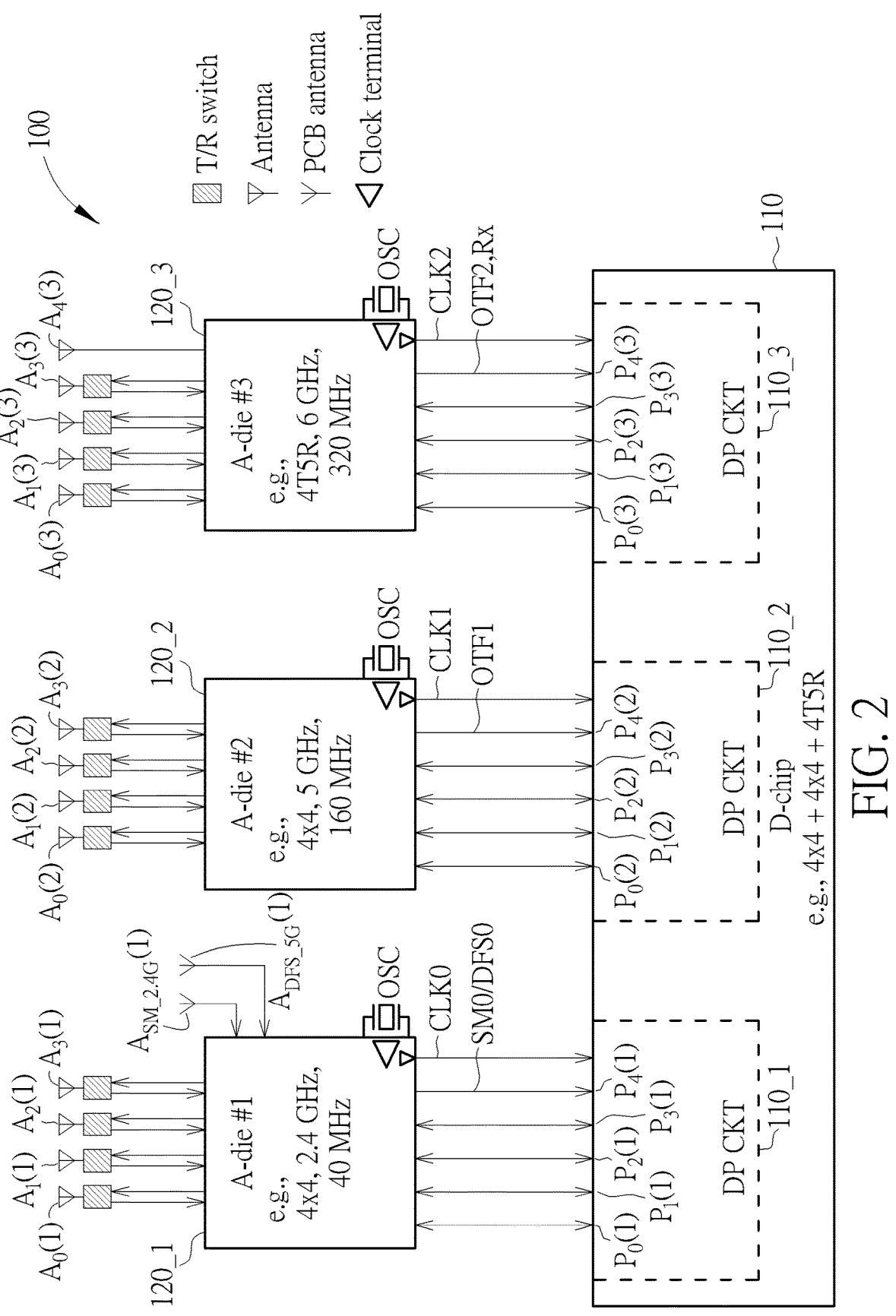
FIG. 2 is a diagram illustrating some configurations of the wireless communications device shown in FIG. 1A according to an embodiment of the present invention.

FIG. 2 is a diagram illustrating some configurations of the wireless communications device 100 shown in FIG. 1A according to an embodiment of the present invention, where N=3, M=4 and K≥4, but the present invention is not limited thereto. According to some embodiments, the architecture of the wireless communications device 100 with these configurations as shown in FIG. 2, the digital processing circuit count N of the multiple digital processing circuits 110_1, 110_2, . . . and 110_N, the common circuit count M of the multiple common circuits $CC_1(n)$, $CC_1(n)$, . . . and $CC_{M-1}$ (n), and/or the function count K of the multiple functions f1, . . . and fK may vary. As shown in FIG. 2, the wireless device control circuit 110 may be implemented as a digital chip (labeled "D-chip" for brevity), for providing a tri-band wireless communications service within the architecture shown in FIG. 2. For example, the digital processing circuits 110_1, 110_2 and 110_3 (labeled "DP CKT" for brevity) may provide a 4×4 wireless communications service of the predetermined radio frequency band BN(0), a 4×4 wireless communications service of the predetermined radio frequency band BN(1) and a 4T5R or 4×5 wireless communications service of the predetermined radio frequency band BN(2), respectively (labeled "4×4+4×4+4T5R" for brevity). In addition, the analog and radio frequency circuits 120_1, 120_2 and 120_3 may be implemented as analog dies #1, #2 and #3 (respectively labeled "A-die #1", "A-die #2" and "A-die #3" for brevity), for performing the associated analog and radio frequency operations of the 4×4 wireless communications service of the predetermined radio frequency band BN(0) (e.g., the 2.4 gigahertz (GHz) band), the 4×4 wireless communications service of the predetermined radio frequency band BN(1) (e.g., the 5 GHz band) and the 4T5R or 4×5 wireless communications service of the predetermined radio frequency band BN(2) (e.g., the 6 GHz band) with the bandwidth BW(0) (e.g., 40 megahertz (MHz)), the bandwidth BW(1) (e.g., 160 MHz) and the bandwidth BW(2) (e.g., 320 MHz), respectively (labeled "4×4, 2.4 GHz, 40 MHz", "4×4, 5 GHz, 160 MHz" and "4T5R, 6 GHz, 320 MHz" for brevity).

The wireless communications device 100 may comprise some oscillators (OSCs) for providing the associated clocks to some components directly or indirectly. For example, the aforementioned any analog and radio frequency circuit 120_n (e.g., any analog and radio frequency circuit among the analog and radio frequency circuits 120_1, 120_2 and 120_3) may receive a clock from an OSC through a clock terminal thereof, for operating according to the clock, and further output the clock CLK(n–1) to the corresponding digital processing circuit 110_n. More particularly, the analog and radio frequency circuit 120_1 may output the clock CLK0 to the digital processing circuit 110_1, the analog and radio frequency circuit 120_2 may output the clock CLK1 to the digital processing circuit 110_2, and the analog and radio frequency circuit 120_3 may output the clock CLK2 to the digital processing circuit 110_3.

As shown in the upper left part of FIG. 2, in addition to the antennas {$A_0(1)$, $A_1(1)$, $A_2(1)$, $A_3(1)$}, the antennas that are coupled to the analog and radio frequency circuit 120_1 may further comprise multiple PCB antennas $A_{DFS\_5G}(1)$ and $A_{SM\_2.4G}(1)$. For example, the analog and radio frequency circuit 120_1 may receive multiple received signals through the multiple PCB antennas $A_{DFS\_5G}(1)$ and $A_{SM\_2.4G}(1)$, utilize the additional analog and radio frequency sub-circuit $ARF_M(1)$ therein to perform analog and radio frequency operations on the multiple received signals received through the multiple PCB antennas $A_{DFS\_5G}(1)$ and $A_{SM\_2.4G}(1)$ to generate an SM-related signal SM0 and a DFS-related signal DFS0, respectively, and send at least one signal among the SM-related signal SM0 and the DFS-related signal DFS0 (labeled "SM0/DFS0" for brevity) to the digital processing circuit 110_1 through the port $P_4(1)$ (e.g., the port $P_M(n)$ shown in 1D, with n=1 and M=4), where the digital processing circuit 110_1 may perform the SM operation according to the SM-related signal SM0 and/or perform the radar detection and DFS operation according to the DFS-related signal DFS0. In addition, the analog and radio frequency circuit 120_2 may utilize the loop-back-configurable architecture thereof (e.g., any loop-back-configurable architecture among the loop-back-configurable architectures respectively shown in FIG. 1E, FIG. 1F and FIG. 1G, where n=2) to obtain the corresponding loop-back signal, and selectively process the loop-back signal with an analog and radio frequency operation, depending on which component is the component to be processed with the OTF calibration, and output the loop-back signal (or the processed signal thereof) to be the OTF signal OTF1, for being input into the digital processing circuit 110_2 through the port $P_4(2)$ (e.g., the port $P_M(n)$ shown in 1D, with n=2 and M=4), where the digital processing circuit 110_2 may perform the OTF calibration operation according to the OTF signal OTF1. Additionally, the analog and radio frequency circuit 120_3 may receive a received signal through the antenna $A_4(3)$, utilize the additional analog and radio frequency sub-circuit $ARF_M(3)$ therein to process the received signal with an analog and radio frequency operation to generate a processed received signal, and send the processed received signal (labeled "Rx" for brevity) to the digital processing circuit 110_3 through the port $P_4(3)$ (e.g., the port $P_M(n)$ shown in 1D, with n=3 and M=4), where the digital processing circuit 110_3 may perform the packet-receiving and sensitivity enhancement operation according to the processed received signal, but the present invention is not limited thereto. For example, the analog and radio frequency circuit 120_3 may utilize the loop-back-configurable architecture thereof (e.g., any loop-back-configurable architecture among the loop-back-configurable architectures respectively shown in FIG. 1E, FIG. 1F and FIG. 1G, where n=3) to obtain the corresponding loop-back signal, and selectively process the loop-back signal with an analog and radio frequency operation, depending on which component is the component to be processed with the OTF calibration, and output the loop-back signal (or the processed signal thereof) to be the OTF signal OTF2, for being input into the digital processing circuit 110_3 through the port $P_4(3)$ (e.g., the port $P_M(n)$ shown in 1D, with n=3 and M=4), where the digital processing circuit 110_3 may perform the OTF calibration operation according to the OTF signal OTF2.

Based on a current mode (e.g., a Tx mode or a Rx mode) in which the digital processing circuit 110_3 is working, the digital processing circuit 110_3 may determine whether the OTF signal OTF2 or the processed received signal (labeled "Rx" for brevity) is needed, control the analog and radio frequency circuit 120_3 to send one of these two signals for being input into the digital processing circuit 110_3 through the port $P_4(3)$ (e.g., the port $P_M(n)$ shown in 1D, with n=3 and M=4), and utilize the selection circuit SEL(3) (e.g., the selection circuit SEL(n) shown in FIG. 1D, with n=3) to automatically switch among the multiple functions f1, . . . and fK. For example, when working in the Tx mode, the digital processing circuit 110_3 may control the analog and radio frequency circuit 120_3 to send the OTF signal OTF2 to the digital processing circuit 110_3, and utilize the selection circuit SEL(3) to automatically switch to the function corresponding to the OTF calibration operation among the multiple functions f1, . . . and fK, for performing the OTF calibration operation according to the OTF signal OTF2. For another example, when working in the Rx mode, the digital processing circuit 110_3 may control the analog and radio frequency circuit 120_3 to send the processed received signal to the digital processing circuit 110_3, and utilize the selection circuit SEL(3) to automatically switch to the function corresponding to the packet-receiving and sensitivity enhancement operation among the multiple functions f1, . . . and fK, for performing the packet-receiving and sensitivity enhancement operation according to the processed received signal. For brevity, similar descriptions for this embodiment are not repeated in detail here.

According to some embodiments, regarding the first case of (n=n1, k=k1), the second case of (n=n2, k=k2) and the second case of (n=n3, k=k3), any additional processing #k (e.g., k=k1, k2 or k3) among the first additional processing such as the additional processing #k1, the second additional processing such as the additional processing #k2 and the third additional processing such as the additional processing #k3 may comprise one or a combination of receiving the packets to increase the receiver sensitivity, performing the radar detection to perform the DFS, performing the SM in the predetermined radio frequency band BN(n−1), and performing the OTF calibration, where the first additional processing, the second additional processing and the third additional processing are different from each other. In addition, the multiple functions f1, . . . and fK may be referred to as Functions #1, . . . and #K. More particularly, when K=3, the multiple functions f1, . . . and fK such as Functions #1, . . . and #K may comprise Functions #1, #2 and #3. For example, k1=1, k2=2 and k3=3. For brevity, similar descriptions for these embodiments are not repeated in detail here.

Figure 3A:
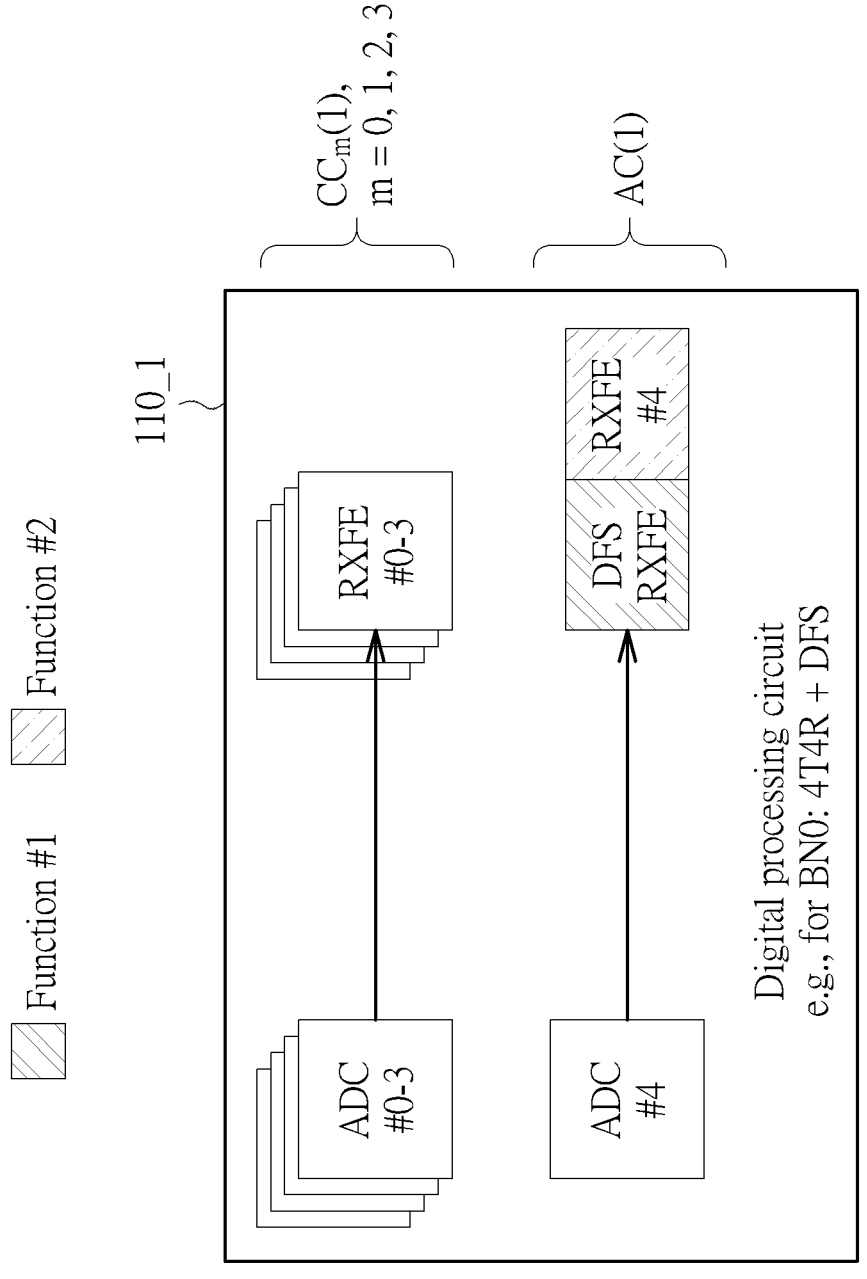
FIG. 3A is a diagram illustrating a first predetermined configuration applied to a first digital processing circuit among multiple digital processing circuits within the wireless communications device shown in FIG. 2 according to an embodiment of the present invention.

FIG. 3A is a diagram illustrating the first predetermined configuration applied to the first digital processing circuit 110_n1 (e.g., the digital processing circuit 110_1) among the multiple digital processing circuits 110_1, 110_2, . . . and 110_N (e.g., the digital processing circuits 110_1, 110_2 and 110_3, when N=3) within the wireless communications device 100 shown in FIG. 2 according to an embodiment of the present invention. For example, the common circuit $CC_m(1)$ (e.g., m=0, 1, 2 or 3) of the digital processing circuits 110_1 may comprise the ADC(s) such as that shown in FIG. 1C, and further comprise the associated receiver frontend circuit(s), etc., where the ADC(s) of the common circuit $CC_m(1)$ may be collectively referred to as the ADC #m, and the associated receiver frontend circuit(s) may be collectively referred to as the RXFE #m. In addition, the additional circuit AC(1) of the digital processing circuits 110_1 may comprise the ADC(s) such as that shown in FIG. 1D, and further comprise the additional receiver frontend circuit(s), etc. related to the packet-receiving and sensitivity enhancement operation and the radar detection and DFS operation, where the ADC(s) of the additional circuit AC(1) may be collectively referred to as the ADC #M (e.g., M=4), the additional receiver frontend circuit(s) related to the packet-receiving and sensitivity enhancement operation may be referred to as the RXFE #M (e.g., M=4), and the additional receiver frontend circuit(s) related to the radar detection and DFS operation may be referred to as the DFS RXFE. For example, the additional receiver frontend circuit(s), etc. related to the packet-receiving and sensitivity enhancement operation may belong to the function f2 such as Function #2, and the additional receiver frontend circuit (s), etc. related to the radar detection and DFS operation may belong to the function f1 such as Function #1. As a result, the digital processing circuits 110_1 may be arranged to perform the associated digital processing operations for the predetermined radio frequency band BN(0) such as the radio frequency band BN0 with a 4T4R antenna configuration as well as the radar detection and DFS operation (labeled "4T4R+DFS" for better comprehension). For brevity, similar descriptions for this embodiment are not repeated in detail here.

Figure 3B:
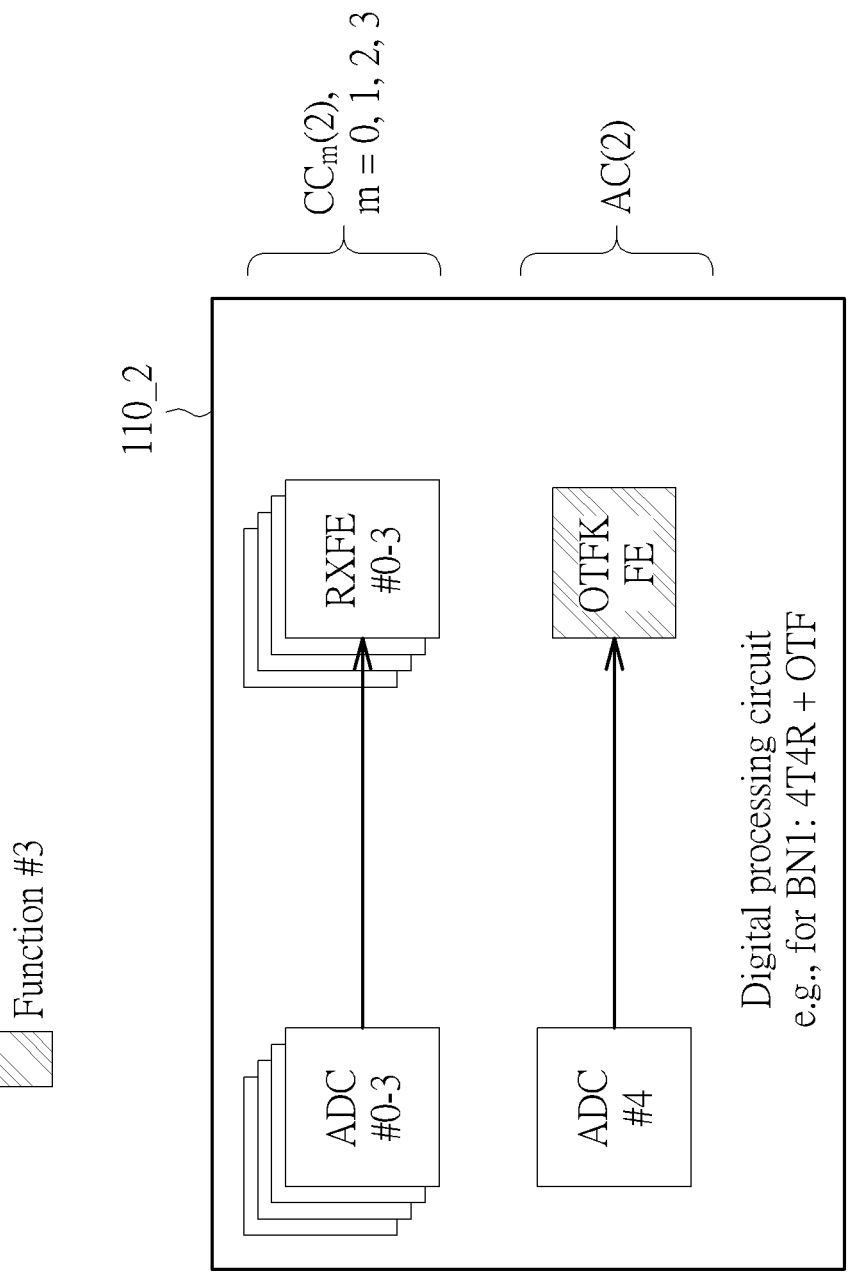
FIG. 3B is a diagram illustrating a second predetermined configuration applied to a second digital processing circuit among the multiple digital processing circuits within the wireless communications device shown in FIG. 2 according to an embodiment of the present invention.

FIG. 3B is a diagram illustrating the second predetermined configuration applied to the second digital processing circuit 110_n2 (e.g., the digital processing circuit 110_2) among the multiple digital processing circuits 110_1, 110_2, . . . and 110_N (e.g., the digital processing circuits 110_1, 110_2 and 110_3, when N=3) within the wireless communications device 100 shown in FIG. 2 according to an embodiment of the present invention. For example, the common circuit $CC_m(2)$ (e.g., m=0, 1, 2 or 3) of the digital processing circuits 110_2 may comprise the ADC(s) such as that shown in FIG. 1C, and further comprise the associated receiver frontend circuit(s), etc., where the ADC(s) of the common circuit $CC_m(2)$ may be collectively referred to as the ADC #m, and the associated receiver frontend circuit(s) may be collectively referred to as the RXFE #m. In addition, the additional circuit AC(2) of the digital processing circuits 110_2 may comprise the ADC(s) such as that shown in FIG. 1D, and further comprise the additional receiver frontend circuit(s), etc. related to the OTF calibration operation, where the ADC(s) of the additional circuit AC(2) may be collectively referred to as the ADC #M (e.g., M=4), and the additional receiver frontend circuit(s) related to the OTF calibration operation may be collectively referred to as the OTFK FE. For example, the additional receiver frontend circuit(s), etc. related to the OTF calibration operation may belong to the function f3 such as Function #3. As a result, the digital processing circuits 110_2 may be arranged to perform the associated digital processing operations for the predetermined radio frequency band BN(1) such as the radio frequency band BN1 with a 4T4R antenna configuration as well as the OTF calibration operation (labeled "4T4R+OTF" for better comprehension). For brevity, similar descriptions for this embodiment are not repeated in detail here.

Figure 3C:
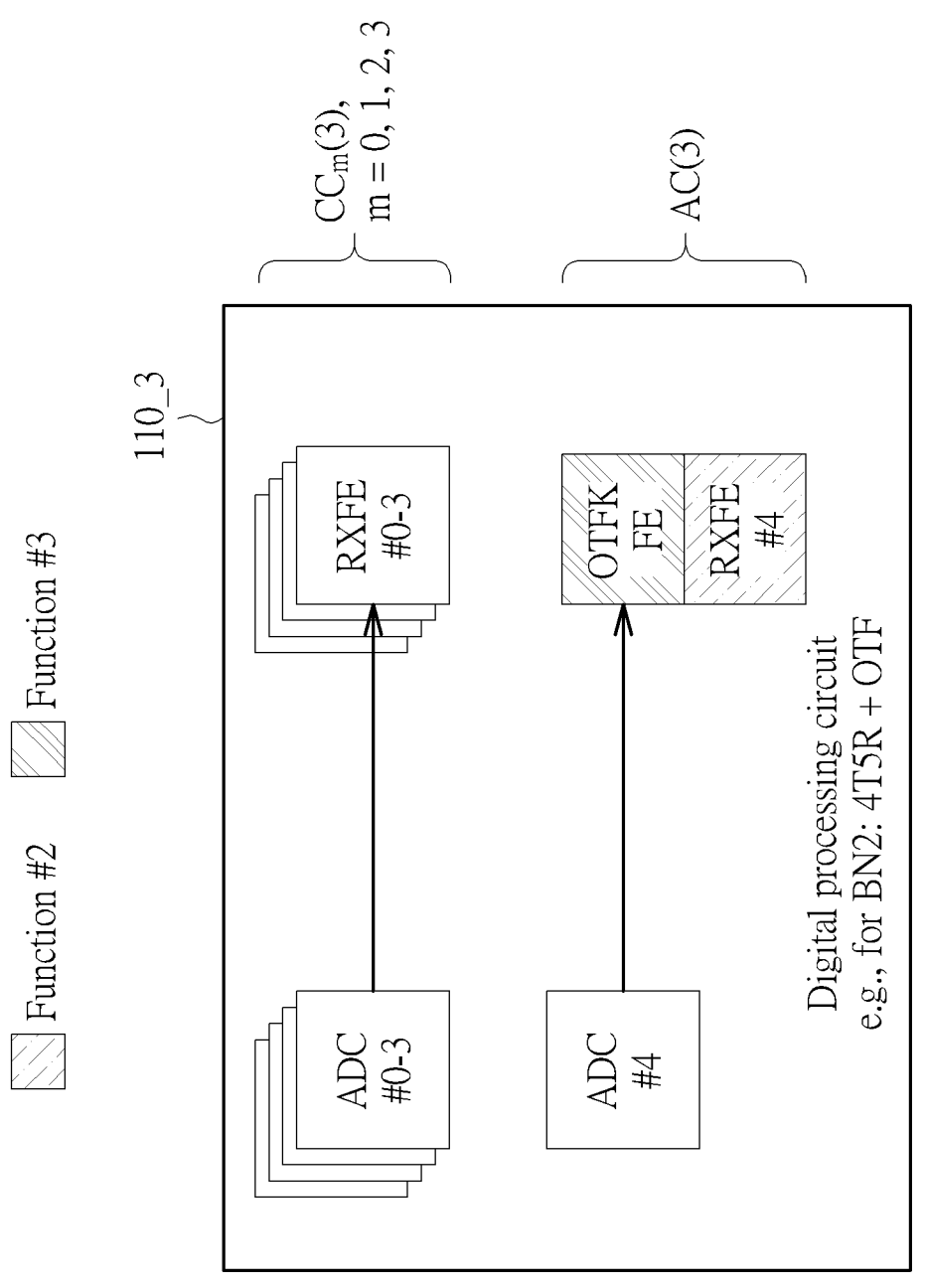
FIG. 3C is a diagram illustrating a third predetermined configuration applied to a third digital processing circuit among the multiple digital processing circuits within the wireless communications device shown in FIG. 2 according to an embodiment of the present invention.

FIG. 3C is a diagram illustrating the third predetermined configuration applied to the third digital processing circuit 110_n3 (e.g., the digital processing circuit 110_N, where N=3) among the multiple digital processing circuits 110_1, 110_2, . . . and 110_N (e.g., the digital processing circuits 110_1, 110_2 and 110_3, when N=3) within the wireless communications device 100 shown in FIG. 2 according to an embodiment of the present invention. For example, the common circuit $CC_m(3)$ (e.g., m=0, 1, 2 or 3) of the digital processing circuits 110_3 may comprise the ADC(s) such as that shown in FIG. 1C, and further comprise the associated receiver frontend circuit(s), etc., where the ADC(s) of the common circuit $CC_m(3)$ may be collectively referred to as the ADC #m, and the associated receiver frontend circuit(s) may be collectively referred to as the RXFE #m. In addition, the additional circuit AC(3) of the digital processing circuits 110_3 may comprise the ADC(s) such as that shown in FIG. 1D, and further comprise the additional receiver frontend circuit(s), etc. related to the packet-receiving and sensitivity enhancement operation and the OTF calibration operation, where the ADC(s) of the additional circuit AC(3) may be collectively referred to as the ADC #M (e.g., M=4), the additional receiver frontend circuit(s) related to the packet-receiving and sensitivity enhancement operation may be referred to as the RXFE #M (e.g., M=4), and the additional receiver frontend circuit(s) related to the OTF calibration operation may be referred to as the OTFK RXFE. For example, the additional receiver frontend circuit(s), etc. related to the packet-receiving and sensitivity enhancement operation may belong to the function f2 such as Function #2, and the additional receiver frontend circuit(s), etc. related to the OTF calibration operation may belong to the function f3 such as Function #3. As a result, the digital processing circuits 110_1 may be arranged to perform the associated digital processing operations for the predetermined radio frequency band BN(2) such as the radio frequency band BN2 with a 4T5R antenna configuration as well as the OTF calibration operation (labeled "4T5R+OTF" for better comprehension). For brevity, similar descriptions for this embodiment are not repeated in detail here.

Figure 4:
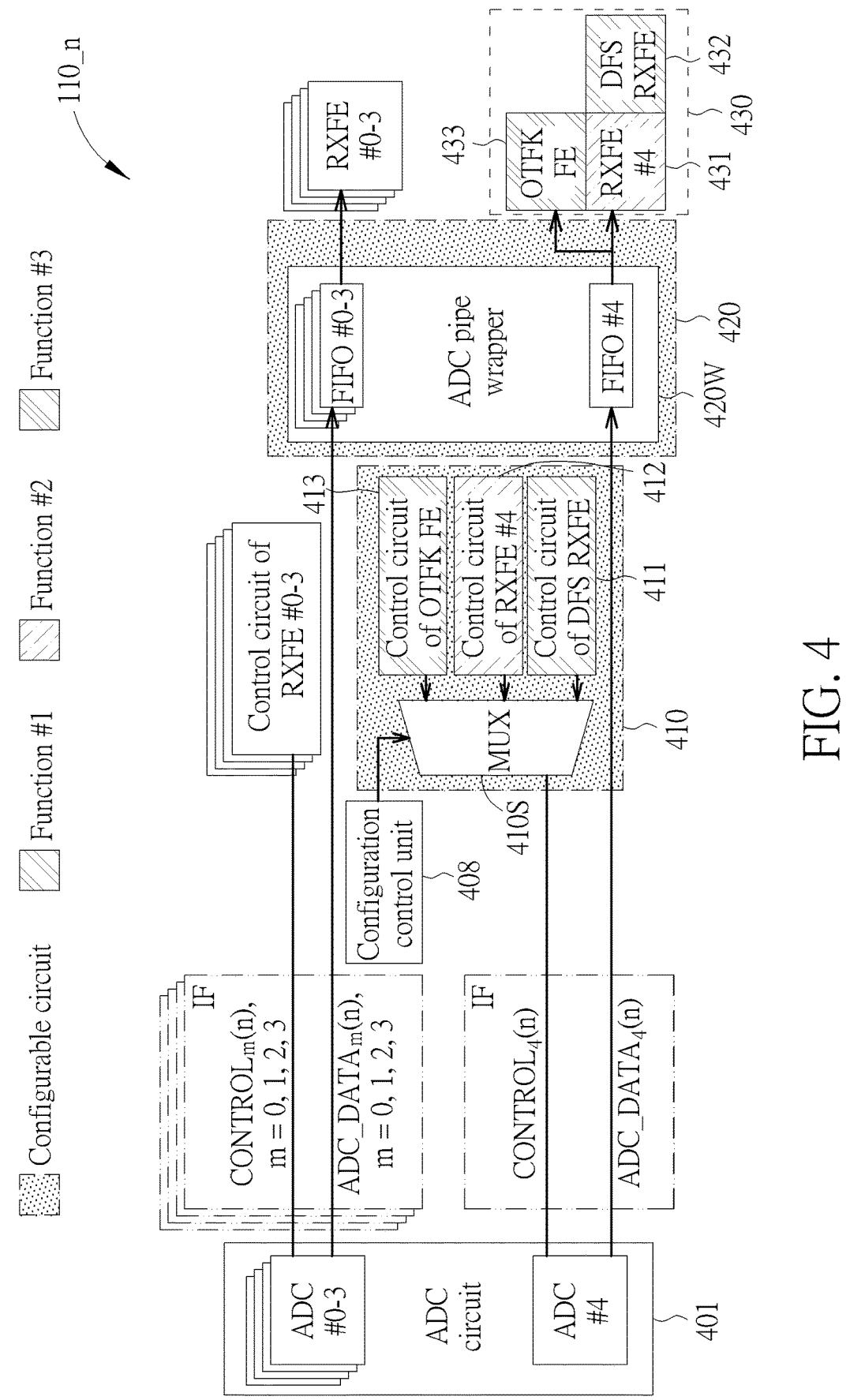
FIG. 4 is a diagram illustrating a common circuitry architecture that is configurable to selectively act as any digital processing circuit among the multiple digital processing circuits within the wireless communications device shown in FIG. 2 according to an embodiment of the present invention.

FIG. 4 is a diagram illustrating a common circuitry architecture that is configurable to selectively act as the aforementioned any digital processing circuit 110_n among the multiple digital processing circuits 110_1, 110_2, . . . and 110_N (e.g., the digital processing circuits 110_1, 110_2 and 110_3, when N=3) within the wireless communications device 100 shown in FIG. 2 according to an embodiment of the present invention, where the multiple functions f1, . . . and fK such as Functions #1, . . . and #K may comprise Functions #1, #2 and #3 of the embodiments shown in FIG. 3A, FIG. 3B and FIG. 3C, and the multiple common circuits $CC_0(n)$, $CC_1(n)$, . . . and $CC_{M-1}(n)$ of the digital processing circuit 110_n may comprise the common circuits $\{CC_m(n) | m=0, 1, 2, 3\}$ such as the common circuits $CC_0(n)$, $CC_1(n)$, $CC_2(n)$ and $CC_3(n)$, but the present invention is not limited thereto. According to some embodiments, the common circuitry architecture shown in FIG. 4, the digital processing circuit count N of the multiple digital processing circuits 110_1, 110_2, . . . and 110_N, the common circuit count M of the multiple common circuits $CC_0(n)$, $CC_1(n)$, . . . and $CC_{M-1}(n)$, and/or the function count K of the multiple functions f1, . . . and fK may vary.

For example, the common circuit $CC_m(n)$ (e.g., m=0, 1, 2 or 3) of the digital processing circuits 110_n may comprise the ADC(s) such as that shown in FIG. 1C, and further comprise the associated first-in-first-out (FIFO) buffer, the associated receiver frontend circuit(s), the control circuit of the associated receiver frontend circuit(s), etc., where the ADC(s) of the common circuit $CC_m(n)$ may be collectively referred to as the ADC #m, the associated FIFO buffer may be referred to as the FIFO #m, and the associated receiver frontend circuit(s) and the control circuit thereof may be referred to as the RXFE #m and the control circuit of RXFE #m. The control circuit of RXFE #m may generate at least one control signal, which may be collectively referred to as the control signal $CONTROL_m(n)$ (e.g., m=0, 1, 2 or 3), for controlling the ADC #m, and the ADC #m may output the data $ADC\_DATA_m(n)$ (e.g., m=0, 1, 2 or 3) according to the control signal $CONTROL_m(n)$. In addition, the additional circuit AC(n) of the digital processing circuits 110_n may comprise the additional ADC(s) such as that shown in FIG. 1D, and further comprise the additional FIFO buffer, the additional receiver frontend circuit(s) related to the radar detection and DFS operation, the additional receiver frontend circuit(s) related to the packet-receiving and sensitivity enhancement operation and the additional receiver frontend circuit(s) related to the OTF calibration operation, as well as the control circuits of these additional receiver frontend circuits, etc., where the ADC(s) of the additional circuit AC(n) may be collectively referred to as the ADC #M (e.g., M=4), the additional FIFO buffer may be referred to as the FIFO #M (e.g., M=4), the additional receiver frontend circuit(s) related to the radar detection and DFS operation, the additional receiver frontend circuit(s) related to the packet-receiving and sensitivity enhancement operation and the additional receiver frontend circuit(s) related to the OTF calibration operation may be referred to as the DFS RXFE, the RXFE #M (e.g., M=4) and the OTFK RXFE, respectively, and the control circuits of these additional receiver frontend circuits may be referred to as the control circuit of DFS RXFE, the control circuit of RXFE #M (e.g., M=4) and the control circuit of OTFK RXFE, respectively. For example, the additional receiver frontend circuit(s), etc. related to the radar detection and DFS operation may belong to the function f1 such as Function #1, the additional receiver frontend circuit(s), etc. related to the packet-receiving and sensitivity enhancement operation may belong to the function f2 such as Function #2, and the additional receiver frontend circuit(s), etc. related to the OTF calibration operation may belong to the function f3 such as Function #3. As a result, the digital processing circuits 110_n may be arranged to perform the associated digital processing operations for the predetermined radio frequency band BN(n−1) with a 4T4R or 4T5R antenna configuration as well as the operation corresponding to the selected function fk (e.g., the selected Function #k).

As shown in FIG. 4, this common circuitry architecture may comprise an ADC circuit 401, at least one configuration control unit such as the configuration control unit 408, at least one configurable circuit such as the configurable circuits 410 and 420 as well as a set of partial circuits 430, where the ADC circuit 401 may comprise the ADCs #0-M such as the ADCs #0-3 and the ADC #4 (e.g., M=4), and the set of partial circuits 430 may comprise partial circuits 431, 432 and 433, for implementing the RXFE #M (e.g., M=4), the DFS RXFE and the OTFK RXFE, respectively. The configurable circuit 410 may comprise partial circuits 411, 412 and 413, for implementing the control circuit of DFS RXFE, the control circuit of RXFE #M (e.g., M=4) and the control circuit of OTFK RXFE, respectively, and further comprise a selection circuit 410S such as a multiplexer (labeled "MUX" for brevity), for selecting a control signal from the control signals generated by the partial circuits 411, 412 and 413 to be the control signal $CONTROL_M(n)$ (e.g., M=4), for example, under control of the configuration control unit 408, for controlling the ADC #M, and the ADC #M may output the data $ADC\_DATA_M(n)$ (e.g., M=4) according to the control signal $CONTROL_M(n)$. The configurable circuit 420 may comprise an ADC pipe wrapper 420W, etc., where the ADC pipe wrapper 420W may comprise the associated FIFO buffers such as the FIFOs #0-(M−1) and the additional FIFO buffer such as the FIFO #M (e.g., M=4). For brevity, similar descriptions for this embodiment are not repeated in detail here.

For better comprehension, the common circuitry architecture shown in FIG. 4 may operate according to the ADC interfacing signals (labeled "IF" for brevity), where the ADC interfacing signals may comprise the control signal $CONTROL_m(n)$ and the data $ADC\_DATA_m(n)$ (e.g., m=0, 1, 2 or 3), and further comprise the control signal $CONTROL_M(n)$ and the data $ADC\_DATA_M(n)$ (e.g., M=4), but the present invention is not limited thereto. According to some embodiments, the ADC interfacing signals may vary. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless device control circuit with modularized internal circuit architecture, for performing communications control within a wireless communications device, the wireless device control circuit comprising: a first digital processing circuit, arranged to perform first digital processing corresponding to a first predetermined radio frequency band for the wireless communications device, wherein the first digital processing comprises common processing and a first additional processing; and a second digital processing circuit, arranged to perform second digital processing corresponding to a second predetermined radio frequency band for the wireless communications device, wherein the second digital processing comprises the common processing and a second additional processing; wherein the first digital processing circuit comprising: multiple first partial circuits, wherein two first partial circuits among the multiple first partial circuits are capable of performing the first additional processing and the second additional processing, respectively; and at least one first selection circuit, coupled to the multiple first partial circuits, arranged to select one of the two first partial circuits according to a first predetermined configuration, for performing the first additional processing; and wherein the first digital processing circuit and the second digital processing circuit are identical to each other, and are arranged to perform the first digital processing and the second digital processing according to the first predetermined configuration and a second predetermined configuration, respectively.

2. The wireless device control circuit of claim 1, wherein:
the first digital processing circuit comprises:
at least one first common circuit, arranged to perform the common processing among the first digital processing; and
at least one first additional circuit, arranged to perform the first additional processing among the first digital processing; and
the second digital processing circuit comprises:
at least one second common circuit, arranged to perform the common processing among the second digital processing; and
at least one second additional circuit, arranged to perform the second additional processing among the second digital processing.

3. The wireless device control circuit of claim 2, wherein the at least one first common circuit and the at least one second common circuit are identical to each other; and the at least one first additional circuit and the at least one second additional circuit are identical to each other, wherein:
at least one first selection circuit within the at least one first additional circuit is arranged to select one of multiple first partial circuits within the at least one first additional circuit according to the first predetermined configuration, for performing the first additional processing; and
at least one second selection circuit within the at least one second additional circuit is arranged to select one of multiple second partial circuits within the at least one second additional circuit according to the second predetermined configuration, for performing the second additional processing.

4. The wireless device control circuit of claim 1,
wherein the second digital processing circuit comprises:
multiple second partial circuits, wherein two second partial circuits among the multiple second partial circuits are capable of performing the first additional processing and the second additional processing, respectively; and
at least one second selection circuit, coupled to the multiple second partial circuits, arranged to select one of the two second partial circuits according to the second predetermined configuration, for performing the second additional processing.

5. The wireless device control circuit of claim 1, wherein the first digital processing circuit comprises:
multiple first analog-to-digital converters, coupled to multiple first antennas through a first analog and radio frequency circuit corresponding to the first predetermined radio frequency band, arranged to perform multiple first analog-to-digital conversion operations on multiple first signal paths coupled to the multiple first antennas, respectively; and a first additional analog-to-digital converter, arranged to perform a first additional analog-to-digital conversion operation on a first additional signal path, for performing the first additional processing.

6. The wireless device control circuit of claim 5, wherein the first additional processing comprises one or a combination of receiving packets to increase receiver sensitivity, performing radar detection to perform dynamic frequency selection (DFS), performing spectrum monitoring (SM) in the first predetermined radio frequency band, and performing on-the-fly (OTF) calibration.

7. The wireless device control circuit of claim 6, wherein:

if the first additional processing comprises receiving the packets to the increase receiver sensitivity, the first additional analog-to-digital converter is coupled to another first antenna through the first analog and radio frequency circuit corresponding to the first predetermined radio frequency band;

if the first additional processing comprises performing the radar detection to perform the DFS or performing the SM in the first predetermined radio frequency band, the first additional analog-to-digital converter is coupled to a printed circuit board (PCB) antenna through the first analog and radio frequency circuit; and if the first additional processing comprises performing the OTF calibration, the OTF calibration is performed according to a loop-back signal, rather than any received signal from any antenna, where the loop-back signal is equal to any signal among an input signal and an output signal of any transmitting-path component on at least one transmitting path passing through the first analog and radio frequency circuit.

8. The wireless device control circuit of claim 1, wherein any additional processing among the first additional processing and the second additional processing comprises one or a combination of receiving packets to increase receiver sensitivity, performing radar detection to perform dynamic frequency selection (DFS), performing spectrum monitoring (SM) in the first predetermined radio frequency band, and performing on-the-fly (OTF) calibration, wherein the first additional processing and the second additional processing are different from each other.

9. The wireless device control circuit of claim 1, further comprising:

a third digital processing circuit, arranged to perform third digital processing corresponding to a third predetermined radio frequency band for the wireless communications device, wherein the third digital processing comprises the common processing and a third additional processing;

wherein the third digital processing circuit is identical to the first digital processing circuit, and is arranged to perform the third digital processing according to a third predetermined configuration.

10. The wireless communications device comprising the wireless device control circuit of claim 1, further comprising:

a first analog and radio frequency circuit, coupled between the first digital processing circuit and a first set of antennas, arranged to perform first analog and radio frequency processing corresponding to the first predetermined radio frequency band for the wireless communications device; and a second analog and radio frequency circuit, coupled between the second digital processing circuit and a second set of antennas, arranged to perform second analog and radio frequency processing corresponding to the second predetermined radio frequency band for the wireless communications device.

11. The wireless communications device of claim 10, further comprising:

a third analog and radio frequency circuit, arranged to perform third analog and radio frequency processing corresponding to a third predetermined radio frequency band for the wireless communications device;

wherein the wireless device control circuit further comprises:

a third digital processing circuit, coupled to a third set of antennas through the third analog and radio frequency circuit, arranged to perform third digital processing corresponding to the third predetermined radio frequency band for the wireless communications device, wherein the third digital processing comprises the common processing and a third additional processing;

wherein the third digital processing circuit is identical to the first digital processing circuit, and is arranged to perform the third digital processing according to a third predetermined configuration.

* * * * *